(12) United States Patent
Hiraishi

(10) Patent No.: US 6,335,771 B1
(45) Date of Patent: Jan. 1, 2002

(54) LIQUID CRYSTAL DISPLAY DEVICE, AND METHODS OF MANUFACTURING AND DRIVING SAME

(75) Inventor: Youichi Hiraishi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/539,782

(22) Filed: Mar. 31, 2000

Related U.S. Application Data

(63) Continuation of application No. 08/962,061, filed on Oct. 31, 1997, now Pat. No. 6,104,450.

(30) Foreign Application Priority Data

Nov. 7, 1996 (JP) .............................................. 8-295353
Nov. 13, 1996 (JP) .............................................. 8-302159

(51) Int. Cl.$^7$ ........................ G02F 1/136; G02F 1/1343
(52) U.S. Cl. ........................................ 349/42; 349/139
(58) Field of Search .................................. 349/42, 139

(56) References Cited

U.S. PATENT DOCUMENTS

| 5,309,264 A | * | 5/1994 | Lien et al. .................. 349/130 |
| 5,646,705 A | | 7/1997 | Higuchi et al. |
| 5,680,190 A | | 10/1997 | Michibayashi et al. |
| 5,748,275 A | * | 5/1998 | Sato et al. .................. 349/144 |
| 5,831,708 A | | 11/1998 | Hiraishi et al. |

FOREIGN PATENT DOCUMENTS

| JP | 5-273569 | 10/1993 |
| JP | 6-59287 | 3/1994 |
| JP | 6-130345 | 5/1994 |
| JP | 7-175037 | 7/1995 |
| JP | 8-220511 | 8/1996 |

* cited by examiner

*Primary Examiner*—William L. Sikes
*Assistant Examiner*—Tarifur R. Chowdhury
(74) *Attorney, Agent, or Firm*—Nixon & Vanderhye P.C.

(57) ABSTRACT

A gate insulating film, a lower-layer pixel electrode, an inter-layer insulating film, and an upper-layer pixel electrode, in that order, are provided on a transparent insulating substrate. The lower-layer pixel electrode and the upper-layer pixel electrode are connected to the drain electrode of a TFT, and a plurality of holes are provided in the upper-layer pixel electrode. Where the upper-layer pixel electrode lies, the image signal voltage is applied directly to the liquid crystal, but where there are holes in the upper-layer pixel electrode, a divided capacitance voltage of the serial capacitances of the liquid crystal and the inter-layer insulating film is applied. In this way, it becomes possible to effectively form within the same pixel several domains with different viewing angle characteristics, without giving rise to disturbance of alignment.

10 Claims, 21 Drawing Sheets

LIQUID CRYSTAL DISPLAY DEVICE, AND METHODS OF MANUFACTURING AND DRIVING SAME

This is a continuation of application Ser. No. 08/962,061, filed Oct. 31, 1997, now U.S. Pat. No. 6,104,450, the entire content of which is hereby incorporated by reference in this application.

FIELD OF THE INVENTION

The present invention relates to a liquid crystal display device incorporating Thin-Film Transistors and other switching elements, for use in display devices such as computer and television devices, and to a method of manufacturing said liquid crystal display device.

BACKGROUND OF THE INVENTION

In the past, liquid crystal display devices of the active matrix type (using Thin-Film Transistors (TFTs), etc.) or simple matrix type (Super-Twisted Nematic (STN), etc.) have been in use. It is well known that in all of these liquid crystal display devices, the light transmittance was dependent on the viewing angle, because the light passed through liquid crystals of different relative alignment states according to the angle from which the screen was viewed. In particular, such screens were difficult to see when viewed from the side. Accordingly, there has been much research seeking to improve these viewing angle characteristics.

FIG. 13 is a plan view showing the structure of one pixel in the active matrix substrate of the liquid crystal display element of Japanese Unexamined Patent Publication No. 5-273569/1993. As shown in FIG. 13, on the active matrix substrate, a Thin-Film Transistor 55 is provided adjacent to the intersection of a gate line 52 with a source line 53.

As shown in FIG. 14, the TFT 55 is made up of the following layered on a transparent insulating substrate 51a of glass or similar material: a gate electrode 56 which is connected to the gate line 52, a gate insulating film 57, and a semiconductor layer 58, which is made of amorphous silicon and which is layered on the gate electrode 56. On the semiconductor layer 58, in sections in order to partially cover the semiconductor layer 58, are n$^+$ —Si layers 59, which serve as ohmic contact layers. On one n$^+$ —Si layer 59 is a source electrode 60, which is connected to the source line 53, and on the other n$^+$ —Si layer 59 is a drain electrode 61, which is connected to a pixel electrode 62.

The pixel electrode 62 is provided in the rectangular area bordered by the gate line 52 and the source line 53, and distributed on the pixel electrode 62 in islet form are transparent insulating films 63 made of $SiN_x$, $SiO_2$, or similar material. Each transparent insulating film 63 also serves as a protective film. The active matrix substrate is completed with the covering of TFT 55, pixel electrode 62, and transparent insulating films 63 with an alignment film (not shown).

On a transparent insulating substrate 51b, provided opposite the active matrix substrate, are layered a counter electrode 65 and an alignment film (not shown), in that order. The liquid crystal display element is completed by filling the space between the two substrates with a liquid crystal 66.

In a liquid crystal display device of this structure, at a', where the transparent insulating films 63 do not cover the pixel electrode 62, the image signal voltage is applied directly to the counter electrode 65, but at b', where the transparent insulating films 63 are provided, a divided capacitance voltage is applied, because the image signal voltage is applied through the serial capacitance of the capacitance of the liquid crystal 66 and the capacitance of the transparent insulating film 63.

In this way, two domains are created within one pixel, each of which applies a different voltage to the liquid crystal 66, resulting in a different light transmittance of the liquid crystal 66 within each domain. Accordingly, viewing angle characteristics when viewing the screen from the side can be improved. Further, by forming a tapered section c' around the edges of the transparent insulating films 63, a clear image without rough edges can be obtained.

However, a disadvantage of the conventional structure outlined above is that the inclusion of the transparent insulating films 63 on the pixel electrode 62 creates a plurality of areas that have uneven surfaces, resulting in disturbance of alignment and deterioration of display characteristics. The thicker transparent the insulating films 63 are made (in order to increase the difference between the voltage applied at area a' and that applied at area b'), the more likely the disturbance of alignment. Further, another problem with increasing the thickness of the transparent insulating films 63 is that gap control becomes difficult, because the cell gap at area a' is different from that at area b'.

In order to solve these problems, Japanese Unexamined Patent Publication No. 7-175037/1995, shown in FIG. 15, disclosed a liquid crystal display device which would prevent the deterioration of alignment by providing a thicker alignment film 67 on the active matrix substrate side, and by making the interface between the alignment film 67 and the liquid crystal 66 a flat surface.

However, in making the surface of the alignment film 67 flat in order to prevent the disturbance of alignment, a minimum film thickness of approximately 0.5 $\mu$m (=500 nm) is necessary, but the applied voltage must be increased, leading to the problem of increased power consumption. Further, the polyimide generally used for the alignment film 67 is not completely colorless, thus decreasing the display quality.

In general, the active-matrix-type liquid crystal display devices have had a comparatively wide viewing angle with good display quality, but the simple-matrix-type liquid crystal display devices have had a narrower viewing angle. For this reason, users selected the type of liquid crystal display device according to their needs, using the active-matrix-type devices having wider viewing angles, for example, for regular use in the office and elsewhere, or for presentations, while using the simple-matrix-type devices having narrower viewing angles in situations calling for privacy, for example, when preparing documents aboard aircraft or elsewhere in public. However, since there were cases when the same liquid crystal display device was used both in the office and aboard aircraft and elsewhere, purchasing a device with a viewing angle suited for one type of use created inconveniences when using the device in other ways.

Japanese Unexamined Patent Publication No. 6-59287/1994, discloses a liquid crystal display device which can meet both types of needs with one device. This liquid crystal display device, as shown in FIG. 21, controls the viewing angle using a TN-type liquid crystal display panel 151 and, for viewing angle control, a guest-host-type liquid crystal panel 152. In concrete terms, when using the device in the office or for a presentation, no voltage is applied to the guest-host-type liquid crystal panel 152, thus scattering the light and enabling a wide viewing angle (see FIG. 21(a)); when using the device aboard an aircraft or where viewing of screen images by others is unwanted, a voltage is applied to the guest-host-type liquid crystal panel 152, allowing the light to be transmitted in one direction only, increasing the parallelism of the backlight, and thereby enabling a narrow viewing angle (see FIG. 21(b)).

However, since this liquid crystal display device uses two liquid crystal panels, the thickness and weight of the device as a whole is increased, as are costs. Further, power to drive the two liquid crystal panels is necessary, as well as power to ensure that the backlight is not dimmed due to passing through the two liquid crystal panels, resulting in the problem of increased power consumption. For these reasons, the liquid crystal display device discussed above could not be used for laptop-type personal computers or other portable information terminals.

SUMMARY OF THE INVENTION

The primary object of this invention is to provide a liquid crystal display device which enables widening of the angle of visibility by effectively forming within a single pixel domains with different viewing angle characteristics, but without giving rise to disturbance of alignment.

Further, the secondary object of this invention is to provide a liquid crystal display device which enables change of the device's angle of visibility in a low-power-consumption, thin, lightweight, low-cost structure.

In order to attain the primary object mentioned above, the first liquid crystal display device of the present invention includes a first substrate having switching elements, scanning lines which transmit driving signals to drive the switching elements, signal lines which transmit image signals to the switching elements, and pixel electrodes connected to the switching elements; a second substrate, having counter electrodes, provided opposite the first substrate; and liquid crystal filling the space between the first substrate and the second substrate. The pixel electrodes are provided in two or more layers with insulating film between each pair of layers, and holes are provided in the pixel electrodes on the uppermost layer opposite the pixel electrodes on the lowest layer.

With the above structure, since the switching element is connected to each pixel electrode, the image signal voltage From the switching element is applied to each pixel electrode. Where there are no holes provided in the pixel electrode on the uppermost layer, the image signal voltage is applied directly to the liquid crystal between the pixel electrode on the uppermost layer and the counter electrode opposite it. On the other hand, where there is a hole provided in the pixel electrode on the uppermost layer, the inter-layer insulating film and the liquid crystal fall between the counter electrode and the pixel electrode on the lowest layer, and therefore the divided capacitance voltage is applied, where the serial capacitance of the capacitance of the liquid crystal and the capacitance of the inter-layer insulating film is applied.

Accordingly, two or more domains where the voltage applied to the liquid crystal differs are provided within a single pixel, and as a result two or more domains where the light transmittance of the liquid crystal differs are provided within a single pixel. This improves the viewing angle characteristics when the screen is viewed from the side.

Further, in the conventional structures, in order to form the domains where the voltage applied to the liquid crystal differs, in accordance with the thickness of transparent insulating films distributed on the pixel electrode in islet form, the voltage was adjusted and applied to the areas covered by the transparent insulating films and the areas not so covered, thus resulting in unevenness on the pixel electrode as thick as the transparent insulating films. However, in the present invention, if the thickness, the dielectric constant, and the area (equal to the area of the holes in the upper-layer pixel electrode) of the inter-layer insulating film are adjusted, the voltage applied to the liquid crystal can be regulated in accordance with the mere presence or absence of the pixel electrode on the uppermost layer, thus creating unevenness only as thick as the pixel electrode on the uppermost layer. By means of this structure, the pixel electrode on the uppermost layer becomes flatter, and the disturbance of alignment can be prevented.

The method of manufacturing the first liquid crystal display device includes the steps of: (a) connecting, on the first substrate, respective switching elements and multiple lowest-layer pixel electrodes so as to be provided in the form of a matrix, and providing scanning lines and signal lines so as to cross one another and be connected to the switching elements; (b) providing, on the lowest-layer pixel electrodes, at least one layer of upper-layer pixel electrodes, electrically connected to the switching elements, with inter-layer insulating film between each pair of layers; (c) providing holes in the pixel electrodes on the uppermost layer so as to be opposite the lowest-layer pixel electrodes; and (d) filling the space between the first substrate and the second substrate opposite it with liquid crystal.

According to this method, the first liquid crystal display device can be prepared easily and with a minimum increase in costs.

Next, in order to attain the secondary object, the second liquid crystal display device of the present invention includes a first substrate having switching elements, scanning lines which transmit driving signals to drive the switching elements, signal lines which transmit image signals to the switching elements, and pixel electrodes connected to switching elements; a second substrate, having a counter electrode, provided opposite the first substrate; and liquid crystal filling the space between the first substrate and the second substrate. The pixel electrodes are provided in two or more layers with insulating film between each pair of layers, holes are provided in the pixel electrodes on the uppermost layer so as to be opposite the pixel electrodes on the lowest layer, and the viewing angle is changed depending upon whether a common image signal is applied to the pixel electrodes on all the layers, or only to the pixel electrodes on the lowest layer.

With the above structure, when the switching element is driven by the driving signals from the scanning line, the image signal from the signal line is sent to the pixel electrodes through the switching element. Thus, the voltage is applied to the liquid crystal between the pixel electrode and the counter electrode.

If a common image signal is applied simultaneously to the pixel electrodes on all the layers within one pixel, in the places where there are no holes in the pixel electrode on the uppermost layer, the image signal is applied directly to the liquid crystal between the pixel electrode on the uppermost layer and its counter electrode. In the places where there is a hole provided in the pixel electrode on the uppermost layer, however, the inter-layer insulating film and the liquid crystal fall between the counter electrode and the pixel electrode on the lowest layer, and therefore the divided capacitance voltage is applied, where the serial capacitance of the capacitance of the liquid crystal and the capacitance of the inter-layer insulating film is applied. Accordingly, two or more domains where the voltage applied to the liquid crystal differs are provided within a single pixel, and as a result two or more regions where the light transmittance of the liquid crystal differs are provided within a single pixel. This improves the viewing angle characteristics when the screen of the liquid crystal display device is viewed from the side, thus enabling a wide viewing angle.

If, on the other hand, the image signal is applied only to the pixel electrodes on the lowest layer, the voltage equal to the divided capacitance voltage is applied to the entirety of the liquid crystal within each pixel, and therefore the light transmittance of the liquid crystal is the same throughout the pixel, thus enabling a narrow viewing angle.

As a result, it becomes possible to change the viewing angle without providing two liquid crystal panels, as was necessary with the conventional structures, and thus provision of a low-cost, thin, lightweight, low-power-consumption liquid crystal display device becomes possible. Accordingly, it can be used in laptop-type computers and other portable information terminals.

Further, the secondary object may be attained by the third liquid crystal display device of the present invention. This device has a structure comprised of a first substrate having switching elements, scanning lines which transmit driving signals to drive the switching elements, signal lines which transmit image signals to the switching elements, and pixel electrodes connected to the switching elements; a second substrate, having counter electrodes, provided opposite the first substrate; and liquid crystal filling the space between the first substrate and the second substrate; where the pixel electrodes are provided in two or more layers with insulating film between each pair of layers, and holes are provided in the upper-layer pixel electrodes and in the inter-layer insulating film immediately beneath each upper-layer pixel electrode so as to be opposite the pixel electrode on the lowest layer, and the viewing angle is changed depending upon whether respective different image signals are simultaneously applied to the pixel electrodes on the different layers, or a common image signal is applied simultaneously to the pixel electrodes on all the layers.

With the above structure, if different image signals are applied simultaneously to the pixel electrodes on different layers within one pixel, in the places where there are no holes in the upper-layer pixel electrodes and the inter-layer insulating film immediately beneath them, the image signal is applied directly to the liquid crystal between the pixel electrode on the uppermost layer and its counter electrode. In the places where there is a hole provided in the upper-layer pixel electrodes and the inter-layer insulating film immediately beneath them, however, the image signal is applied directly to the liquid crystal between the pixel electrode on the lowest layer and its counter electrode. Since the image signals applied to the pixel electrodes on the upper and lowest layers differ, two or more domains where the voltage applied to the liquid crystal differs are provided within a single pixel, and as a result two or more domains where the light transmittance of the liquid crystal differs are provided within a single pixel. This improves the viewing angle characteristics when the screen of the liquid crystal display device is viewed from the side, thus enabling a wide viewing angle.

If, on the other hand, a common image signal is applied to the pixel electrodes on the different layers, the same voltage is applied to the entirety of the liquid crystal within the pixel, and therefore the light transmittance of the liquid crystal is the same throughout the pixel. This enables a narrow viewing angle.

Thus, it becomes possible to change the viewing angle without providing two liquid crystal panels, as was necessary with the conventional structures, and thus provision of a low-cost, thin, lightweight, low-power-consumption liquid crystal display device becomes possible.

The other objects, features, and superior points of this invention will be made clear by the description below. Further, the advantages of this invention will be evident from the following explanation which refers to the Figures.

DESCRIPTION OF THE EMBODIMENTS

[First Embodiment]

The following is an explanation of the first embodiment of the present invention, with reference to FIGS. 1 through 3 and FIGS. 9 through 12.

Figure 2:
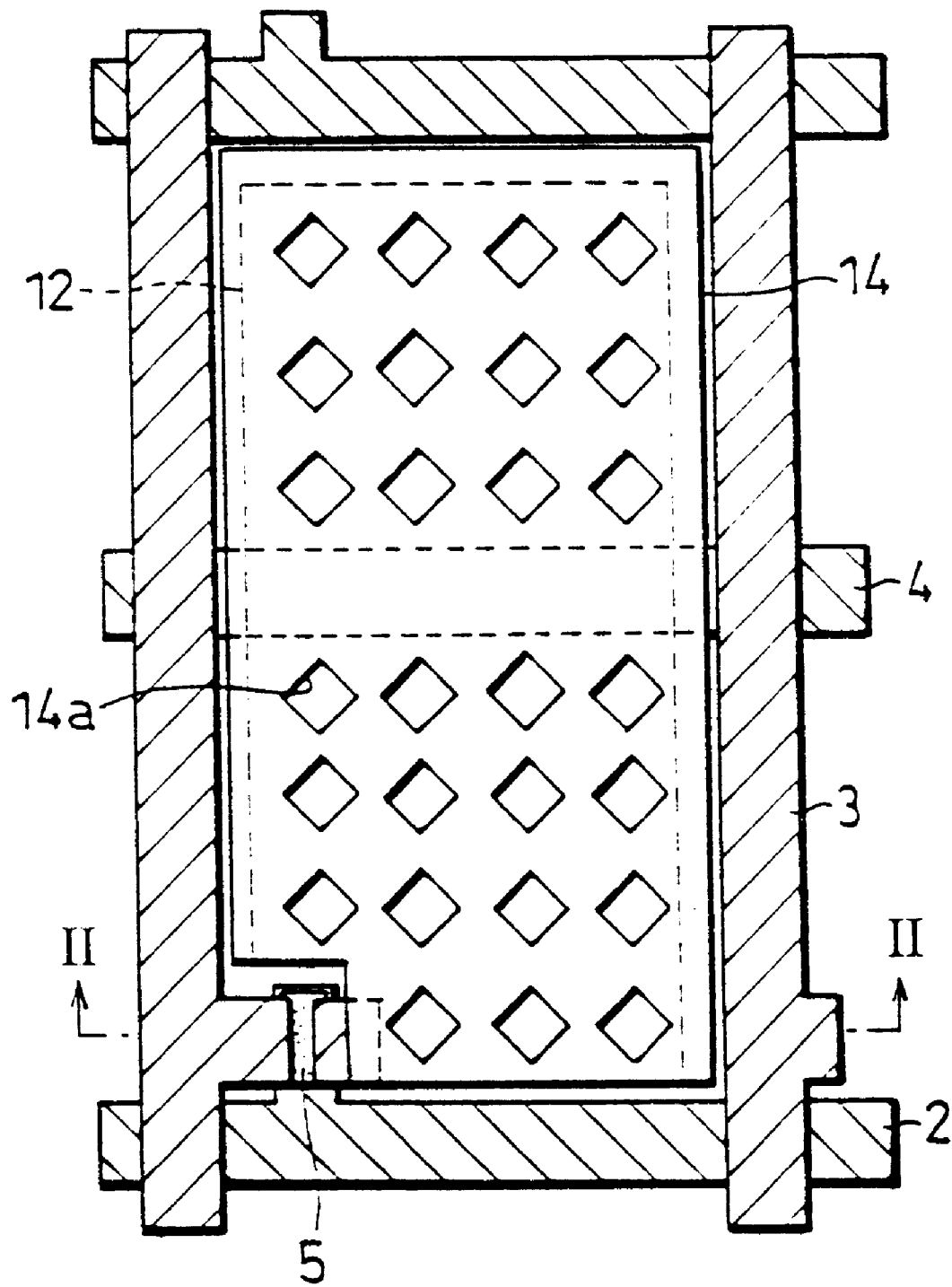
FIG. 2 is a plan view showing a structure of the liquid crystal display device shown in FIG. 1.

The liquid crystal display device of the present embodiment, as shown in FIG. 2, is provided with gate lines 2 as scanning lines, source lines 3 as signal lines, and an additional capacitance (Cs) line 4. The Cs line 4 serves to create additional capacitance at the place where it overlaps with lower-layer pixel electrode 12 (mentioned below).

The rectangular space bordered by the gate lines 2 and the source lines 3 corresponds to one pixel, and a TFT 5 is provided as a switching element adjacent to the intersection of each gate line 2 with each source line 3. Only one pixel is shown in FIG. 2, but the TFTs 5 are arranged in a matrix form.

Figure 1:
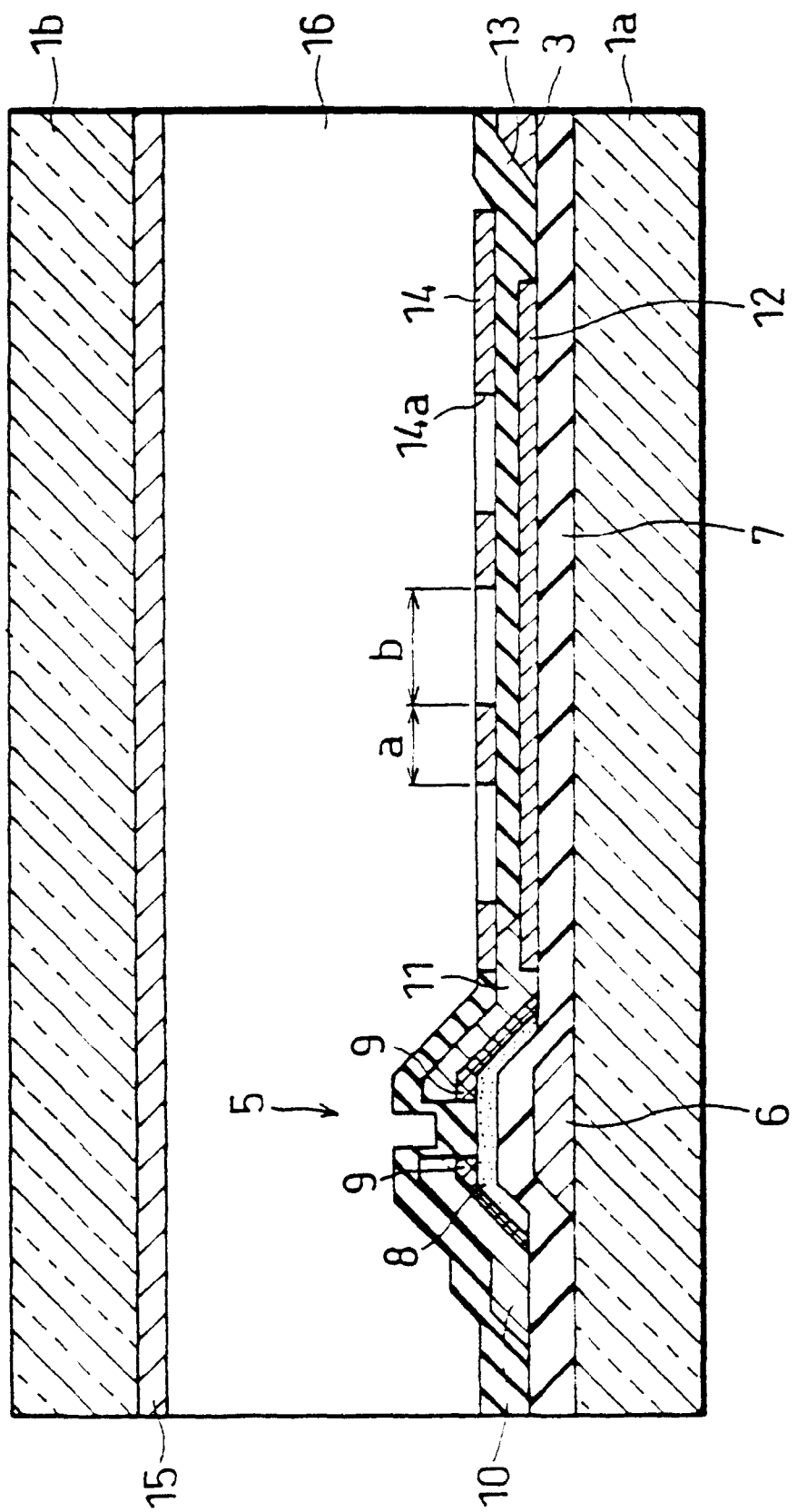
FIG. 1 is a sectional view showing a structure of one pixel in an active matrix substrate of a liquid crystal display device in the first embodiment of the present invention.

As shown in FIG. 1 (a sectional view taken on line II—II of FIG. 2), the TFT 5 is composed of the following layered on a transparent insulating substrate 1a of glass or similar material: a gate electrode 6, a gate insulating film 7, a semiconductor layer 8, n$^+$—Si layers 9, a source electrode 10, and a drain electrode 11.

The gate electrode 6 is made of tantalum, aluminum, or similar material of 300 nm thickness, and is connected to the gate line 2.

On the gate electrode 6, the gate insulating film 7 is provided of silicon nitride (SiN$_x$) or similar material of 350 nm thickness.

On the gate insulating film 7, the semiconductor layer 8 is provided of amorphous silicon or similar material of 100 nm thickness, and is provided to overlap the gate electrode 6.

The n$^+$—Si layer 9 is provided of $\mu$c (micro-crystal) n$^+$—Si or similar material of 80 nm thickness, and is provided as an ohmic contact in sections to partially cover the semiconductor layer 8.

On one of the n$^+$—Si layers 9, the source electrode 10 is provided of tantalum, aluminum, Indium Tin Oxide (ITO), or similar material of 300 nm thickness, and is connected to the source line 3.

On the other n$^+$—Si layer 9, the drain electrode 11 is provided of tantalum, aluminum, ITO, or similar material of 300 nm thickness, and is connected to the lower-layer pixel electrode 12 (mentioned below).

Further, the pixel area within the rectangular area mentioned above is provided with, layered on the gate insulating film 7, a lower-layer pixel electrode 12, an inter-layer insulating film 13, and an upper-layer pixel electrode 14.

When the liquid crystal display device is of the transmittance type, the lower-layer pixel electrode 12 is made of a transparent conductive film of ITO or other similar material of 100 nm thickness, and is connected to the drain electrode 11 of the TFT 5. When the liquid crystal display device is of the reflective type, the lower-layer pixel electrode 12 may be provided of a highly reflective metal such as aluminum of 100 nm thickness.

The inter-layer insulating film 13, made of silicon nitride of 500 nm thickness, is provided between the lower-layer pixel electrode 12 and the upper-layer pixel electrode 14, and insulates the two pixel electrode layers from each other. Further, the inter-layer insulating film 13 also covers and protects the TFT 5. The material used as protective film in conventional structures may be used for this inter-layer insulating film 13.

The upper-layer pixel electrode 14, made of a transparent conductive film of ITO or other similar material of 50 nm thickness, is layered on the inter-layer insulating film 13, and is connected to the drain electrode 11 of the TFT 5. The upper-layer pixel electrode 14 is provided so that its outer edges extend beyond those of the lower-layer pixel electrode 12. Further, a plurality of holes 14a are provided in the upper-layer pixel electrode 14. The holes 14a, for example a pattern of diamond-shaped holes as shown in FIG. 2, are provided in the upper-layer pixel electrode 14 above the place where the lower-layer pixel electrode 12 is provided. The size of each hole 14a depends on the size of the upper-layer pixel electrode 14, but is from several $\mu$m to several tens of $\mu$m.

On the upper-layer pixel electrode 14, an alignment film of 50 nm thickness is provided (not shown). The foregoing explanation describes the structure of the active matrix substrate containing the TFT 5 (the first substrate).

Provided opposite the active matrix substrate structured as described above is an opposing substrate (the second substrate), which, as shown in FIG. 1, is composed of a counter electrode 15 and an alignment film (not shown), layered in that order on a transparent insulating substrate 1b.

The liquid crystal display device in this embodiment is completed by filling the space between the active matrix substrate mentioned above and the opposing substrate with a liquid crystal 16.

Next, the effective voltage of the liquid crystal 16 will be explained with reference to FIGS. 1 and 3.

At area a, where the upper-layer pixel electrode 14 is provided above the lower-layer pixel electrode 12, the image signal voltage is applied directly between the upper-layer pixel electrode 14 and the counter electrode 15. Accordingly, the equivalent circuit for area a is as shown in FIG. 3 at (a), and the effective voltage $V_{LC}$ of the liquid crystal 16 at area a is shown by the following:

$$V_{LC} = \frac{C_1 C_2}{C_1 C_2 + C_{LC}(C_1 + C_2)} V_{ap} \qquad (1)$$

Figure 3:
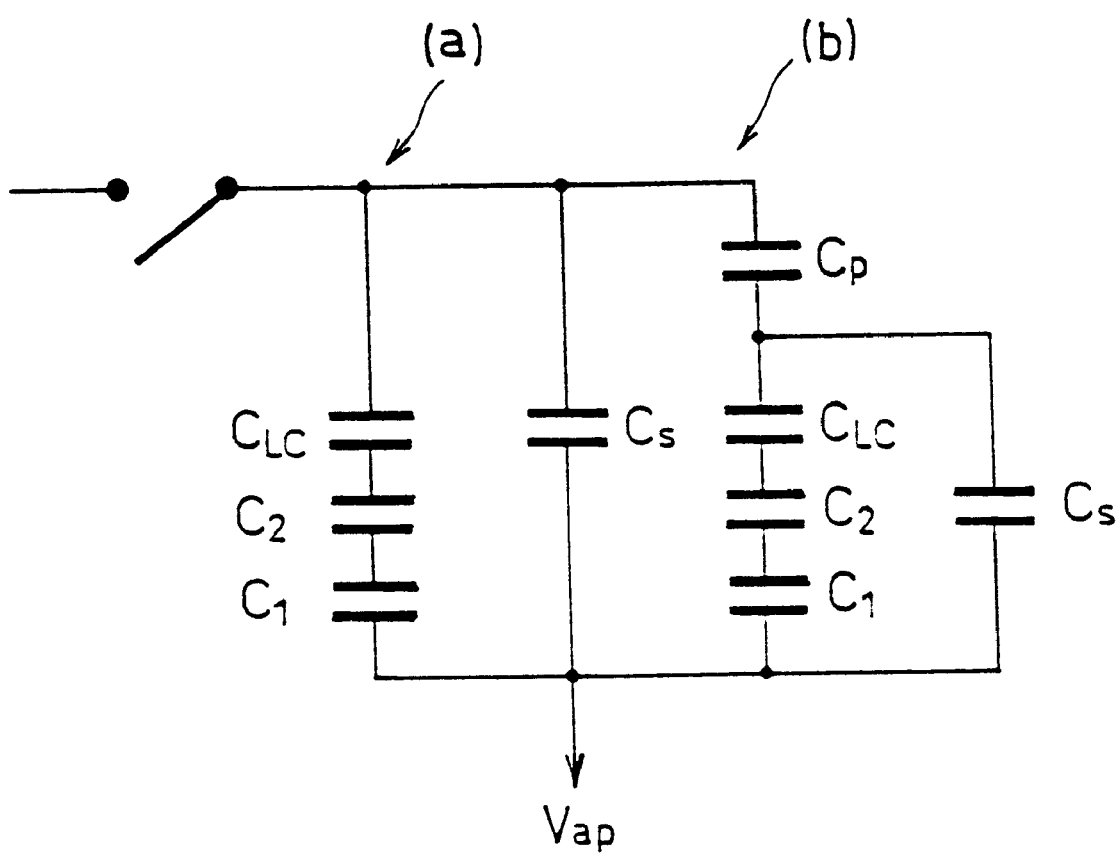
FIG. 3 is a circuit diagram showing an equivalent circuit within one pixel of the liquid crystal display device shown in FIG. 1.

Here, $C_1$ is the capacitance of the alignment film on the opposing substrate side, $C_2$ is the capacitance of the alignment film on the active matrix substrate side, $C_{LC}$ is the capacitance of the liquid crystal 16, $V_{ap}$ is the voltage applied, and $C_s$ in FIG. 3 is the additional capacitance of the Cs line 4.

Usually, the capacitance is defined by the capacitance equation below. Here, $\varepsilon_0$ is the dielectric constant of a vacuum, $\varepsilon_s$ is the dielectric constant of a dielectric film material, S is the area of the dielectric film, and d is the thickness of the dielectric film.

$$C = \varepsilon_0 \varepsilon_s \frac{S}{d}$$

If the area of the alignment film (S) is a constant, and the alignment films on both the opposing substrate side and the active matrix side are of the same material, the effective voltage $V_{LC}$ at area a is shown as follows, by the substitution of the capacitance equation for equation (1) above.

$$V_{LC} = \frac{\varepsilon_{or}}{\varepsilon_{or} + \varepsilon_{LC}(d_1 + d_2)/d_{LC}} V_{ap} \quad (2)$$

Here, $\varepsilon_{or}$ is the dielectric constant of the alignment film material, $\varepsilon_{LC}$ is the dielectric constant of the liquid crystal, $d_1$ is the thickness of the alignment film on the opposing substrate side, $d_2$ is the thickness of the alignment film on the active matrix substrate side, and $d_{LC}$ is the effective cell gap of the liquid crystal 16.

At area b, on the other hand, where the upper-layer pixel electrode 14 is not provided above the lower-layer pixel electrode 12 (the holes 14a), the equivalent circuit is as shown in FIG. 3 at (b), and a divided capacitance voltage of the serial capacitance of the capacitance $C_p$ of the inter-layer insulating film 13, the capacitance $C_{LC}$ of the liquid crystal 16, and the capacitances $C_1$, $C_2$ of the alignment films is applied. Accordingly, the effective voltage $V_{LC}$ of the liquid crystal 16 at the area b is shown by the following:

$$V_{LC} = \frac{C_1 C_2 C_p}{C_1 C_2 C_p + C_{LC}(C_1 C_2 + C_1 C_p + C_2 C_p)} V_{ap} \quad (3)$$

If the capacitance equation is substituted for equation (3) in the same way as in the case of area a, the applied voltage $V_{LC}$ at area b will be as shown below. Here, $\varepsilon_p$ is the dielectric constant of the inter-layer insulating film material, and $d_p$ is the thickness of the inter-layer insulating film 13.

$$V_{LC} = \frac{\varepsilon_{or}\varepsilon_p}{\varepsilon_{or}\varepsilon_p + \varepsilon_{LC}(d_1\varepsilon_p + d_2\varepsilon_p + d_p\varepsilon_{or})/d_{LC}} V_{ap} \quad (4)$$

As is clear from equations (1) through (4) above, in the liquid crystal display device of the present embodiment, two domains where the voltage applied to the liquid crystal 16 (effective voltage $V_{LC}$) differs are provided within one pixel, and as a result two domains where the light transmittance of the liquid crystal 16 differs are provided within one pixel. Accordingly, it is possible to improve the viewing angle characteristics when the screen of the liquid crystal display device is viewed from the side.

In this case, the places where the image signal voltage is directly applied are those where the upper-layer pixel electrode 14 is provided on the inter-layer insulating film 13 (area a), and the places where the divided capacitance voltage is applied are the holes 14a in the upper-layer pixel electrode 14 (area b). Accordingly, if the thickness $d_p$, dielectric constant $\varepsilon_p$, and area (the area of the holes 14a) of the inter-layer insulating film 13 are adjusted, the effective voltage $V_{LC}$ can be regulated by the mere presence or absence of the upper-layer pixel electrode 14.

Since the amount of unevenness in the surface of the alignment film provided on the upper-layer pixel electrode 14 is determined by the thickness of the upper-layer pixel electrode 14 alone (approximately 50 nm), the surface is nearly flat, thus keeping disturbance of alignment to a minimum. As a result, a liquid crystal display device with good display quality can be realized.

Moreover, since the lower-layer pixel electrode 12 and the source line 3 are separated from the upper-layer pixel electrode 14 by the inter-layer insulating film 13, leakage will not occur even if the upper-layer pixel electrode 14 is provided close to or even overlapping the source line 3. Further, although the lower-layer pixel electrode 12 and the source line 3 are provided on the same layer, since they are separated by the inter-layer insulating film 13, leakage will not occur here either.

In conventional structures, since the pixel electrode and source line were provided on the same layer, bringing them too close together led to leakage and a marked impairment of quality, but in the present structure, quality can be improved, since leakage is not likely to occur even if the upper-layer pixel electrode 14 and the source line 3 are provided close to each other.

Further, since the edges of the upper-layer pixel electrode 14 extend beyond those of the lower-layer pixel electrode 12, and no holes 14a are provided in the portion of the upper-layer pixel electrode 14 extending beyond the lower-layer pixel electrode 12, the aperture rate of the liquid crystal display device is determined by the size of the upper-layer pixel electrode 14. Accordingly, since decreasing the size of the lower-layer pixel electrode 12 does not decrease the aperture rate, more space can be allowed between the lower-layer pixel electrode 12 and the source line 3. As a result, further prevention of leakage between the lower-layer pixel electrode 12 and the source line 3 is possible, and it is possible effectively to provide a liquid crystal display device with a high aperture rate.

Next, Table 1 shows the results of a performance evaluation of a liquid crystal device with the structure described above. The liquid crystal used in this case had, during half-tone display, a dielectric constant $\varepsilon_{LC}$ of 6.0 and a cell gap $d_{LC}$ of 4.5 µm. The material used for the alignment film was a polyimide with a dielectric constant $\varepsilon_{or}$ of 3.4, and the thickness $d_1$, $d_2$ of the alignment films was 50 nm each. Table 1 shows relative values for effective voltages during half-tone display (the effective voltage when viewing angle is not controlled is 100%) calculated using equations (2) and (4) above; the voltage difference shows the difference in the effective voltage between area a and area b.

TABLE 1

| | EMBODIMENT 1 | | EMBODIMENT 2 | |
|---|---|---|---|---|
| | AREA a | AREA b | AREA a | AREA b |
| DIELECTRIC CONSTANT $\varepsilon_{or}$ | 3.4 | 3.4 | 3.4 | 3.4 |
| DIELECTRIC CONSTANT $\varepsilon_{LC}$ | 6.0 | 6.0 | 6.0 | 6.0 |
| DIELECTRIC CONSTANT $\varepsilon_p$ | — | 8.0 | — | 3.4 |
| FILM THICKNESS $d_1$ (nm) | 5G | 50 | 50 | 50 |
| FILM THICKNESS $d_2$ (nm) | 50 | 50 | 50 | 50 |
| CELL GAP $d_{LC}$ (µm) | 4.5 | 4.5 | 4.5 | 4.5 |
| FILM THICKNESS $d_p$ (nm) | — | 500 | — | 1500 |
| MATERIAL OF INTER-LAYER INSULATING FILM | — | $SiN_x$ | — | ACRYLIC |
| EFFECTIVE VOLTAGE (%) | 96.18 | 88.95 | 96.18 | 61.12 |
| VOLTAGE DIFFERENCE (%) | — | −8.13 | — | −57.37 |

Figure 14:
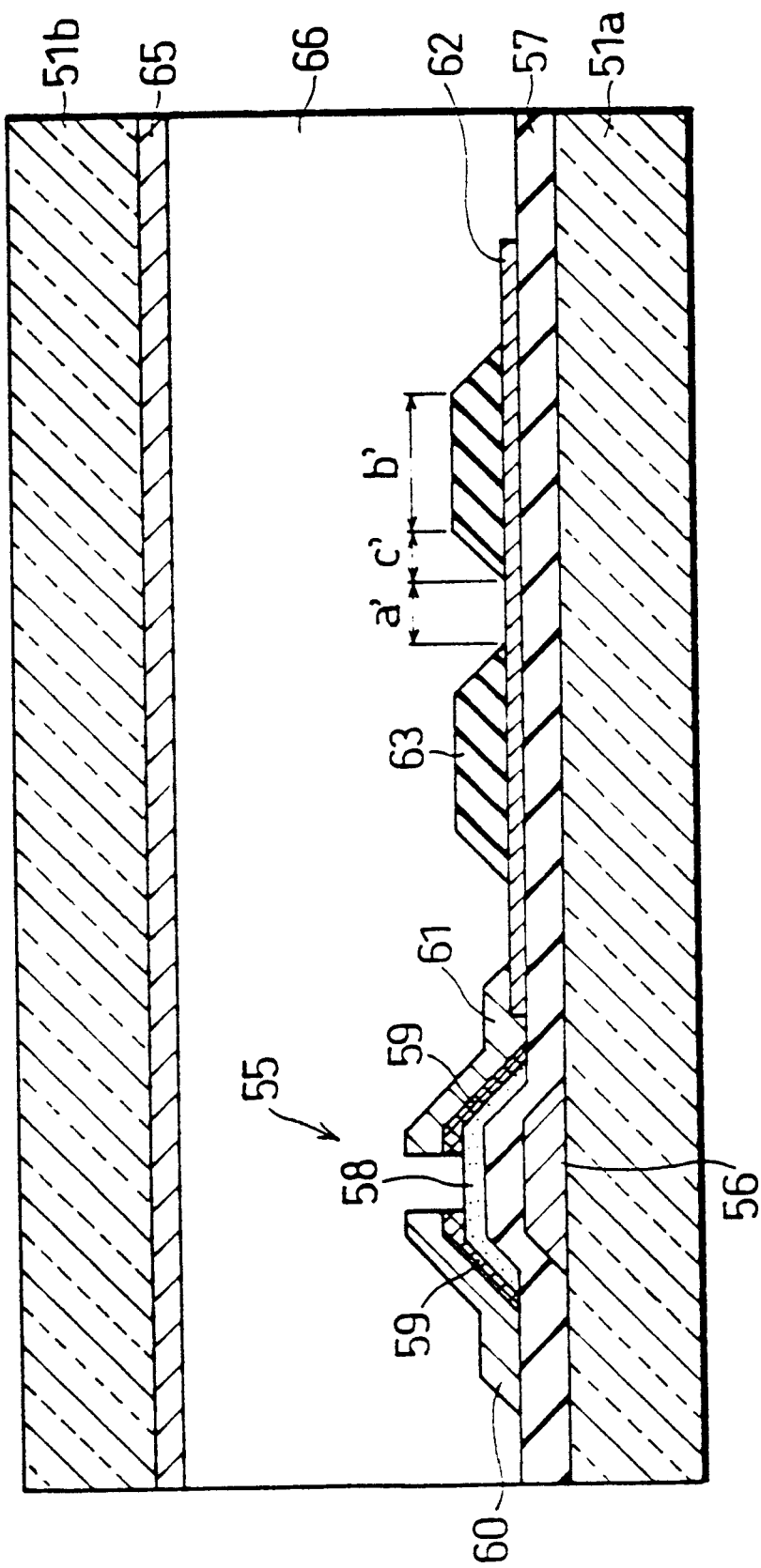
FIG. 14 is a sectional view taken on line XIV—XIV of the conventional liquid crystal device shown in FIG. 13.
Figure 15:
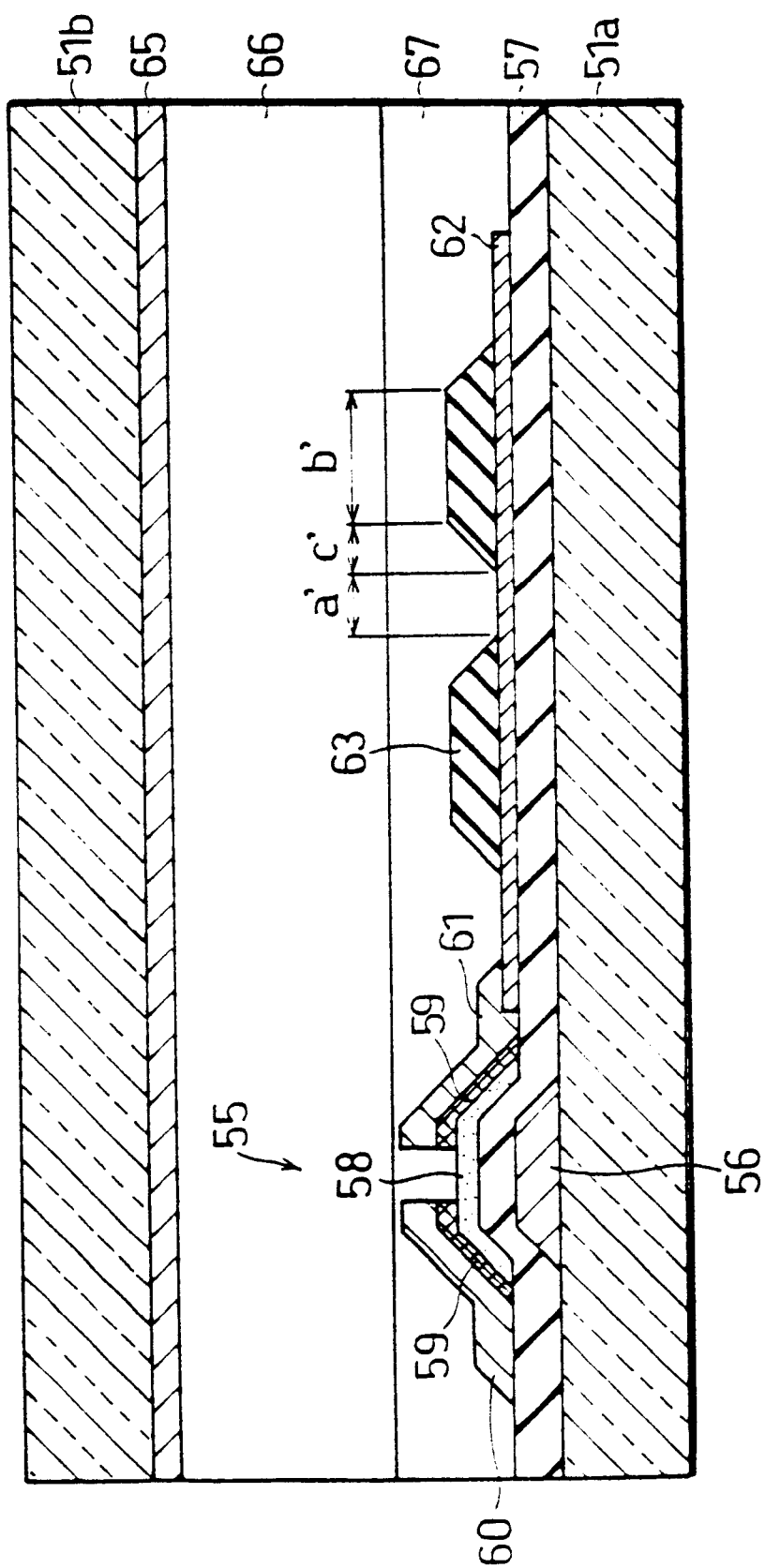
FIG. 15 is a sectional view showing a structure of one pixel in an active matrix substrate of another conventional liquid crystal display device.

Next, for the purposes of comparison, Table 2 shows as Comparative Examples 1 and 2 the results of performance evaluations of the panel disclosed by Japanese Unexamined Patent Publication No. 5-273569/1993 (see FIG. 14) and as Comparative Examples 3 and 4 the results of performance evaluations of the panel disclosed by Japanese Unexamined Patent Publication No. 7-175037/1995 (see FIG. 15), both discussed above as examples of conventional art. In Table 2, dielectric constant $\epsilon_p$ and film thickness $d_p$ are the dielectric constant and film thickness of the transparent insulating film 63.

TABLE 2

| | COMPARATIVE EXAMPLES | | | | | | | |
|---|---|---|---|---|---|---|---|---|
| | 1 | | 2 | | 3 | | 4 | |
| | AREA a' | AREA b' | AREA a' | AREA b' | AREA a' | AREA b' | AREA a' | AREA b' |
| DIELECTRIC CONSTANT $\epsilon_{or}$ | 3.4 | 3.4 | 3.4 | 3.4 | 3.4 | 3.4 | 3.4 | 3.4 |
| DIELECTRIC CONSTANT $\epsilon_{LC}$ | 6.0 | 6.0 | 6.0 | 6.0 | 6.0 | 6.0 | 6.0 | 6.0 |
| DIELECTRIC CONSTANT $\epsilon_p$ | — | 8.0 | — | 8.0 | — | 4.0 | — | 4.0 |
| FILM THICKNESS $d_1$ (nm) | 50 | 50 | 50 | 50 | 50 | 50 | 50 | 50 |
| FILM THICKNESS $d_2$ (nm) | 50 | 50 | 50 | 50 | 500 | 100 | 1000 | 500 |
| CELL GAP $d_p$ ($\mu$m) | 4.5 | 4.2 | 4.5 | 4.0 | 4.5 | 4.5 | 4.5 | 4.5 |
| FILM THICKNESS $d_p$ (nm) | — | 300 | — | 500 | — | 400 | — | 500 |
| MATERIAL OF TRANSPARENT INSULATING FILM | — | SiN$_x$ | — | SiN$_x$ | — | SiO$_2$ | — | SiO$_2$ |
| EFFECTIVE VOLTAGE (%) | 96.18 | 91.16 | 96.18 | 88.25 | 82.05 | 83.69 | 70.55 | 72.06 |
| VOLTAGE DIFFERENCE (%) | — | −5.50 | — | −8.98 | — | −1.96 | — | −2.10 |

In order to simplify the comparison, the liquid crystal used in this performance evaluation, just as in the performance evaluation of this embodiment, had a dielectric constant $\epsilon_{LC}$ of 6.0 and a cell gap $d_{LC}$ of 4.5 $\mu$m at the places where there was no transparent insulating film 63 (area a'). The material used for the alignment film was a polyimide with a dielectric constant $\epsilon_{or}$ of 3.4. The thickness $d_1$ of the alignment film on the opposing substrate side was 50 nm, and the thickness $d_2$ of the alignment film on the active matrix substrate side was 50 nm, except in the case of Comparative Examples 3 and 4. As the transparent insulating film 63, silicon nitride ($\epsilon_p$=8.0) was used in Comparative Examples 1 and 2, and silicon dioxide ($\epsilon_p$=4.0) was used in Comparative Examples 3 and 4.

As a result of the comparison above, it was found that the liquid crystal display device in this embodiment had characteristics generally equivalent to those of Comparative Example 2, but did not give rise to disturbance of alignment, and easily obtained cell gap.

Further, the applied voltage at area a' of Comparative Examples 1 and 2 was the same as that at area a of this embodiment, but since the aperture rate is increased in this embodiment, less backlight is necessary, thus enabling reduced power consumption. For example, in an 11.3-type SVGA, the aperture rate for the conventional structures was 65%, but is 75% to 80% in the present embodiment, and in a 12.1-type XGA, the aperture rate for the conventional structures was 60%, but is 70% to 75% in the present embodiment.

If the aperture rate in a conventional structure was, for example, 60%, and this was improved to 80% in the present embodiment, the same brightness could be obtained with a 33% decrease in the backlight.

In regard to Comparative Examples 1 and 2, it can be seen that increasing the thickness $d_p$ of the transparent insulating film 63 is effective, but since this gives rise to disturbance of alignment, and since the change in cell gap makes gap control difficult, this structure is in effect unusable.

Further, in regard to Comparative Examples 3 and 4, it was found that since there is little difference in the dielectric constants of the polyimide used for the alignment film 67 and the silicon dioxide used for the transparent insulating films 63, the voltage was not divided very effectively. Further, in order to make the surface of the alignment film 67 flat so as to prevent disturbance of alignment, a film thickness of at least about 500 nm (=0.5 $\mu$m) was necessary, necessitating an increase of the voltage applied, and thus increasing power consumption.

Next, the method of manufacturing the liquid crystal display device explained above will be explained with reference to FIGS. 9 and 1.

Figure 9:
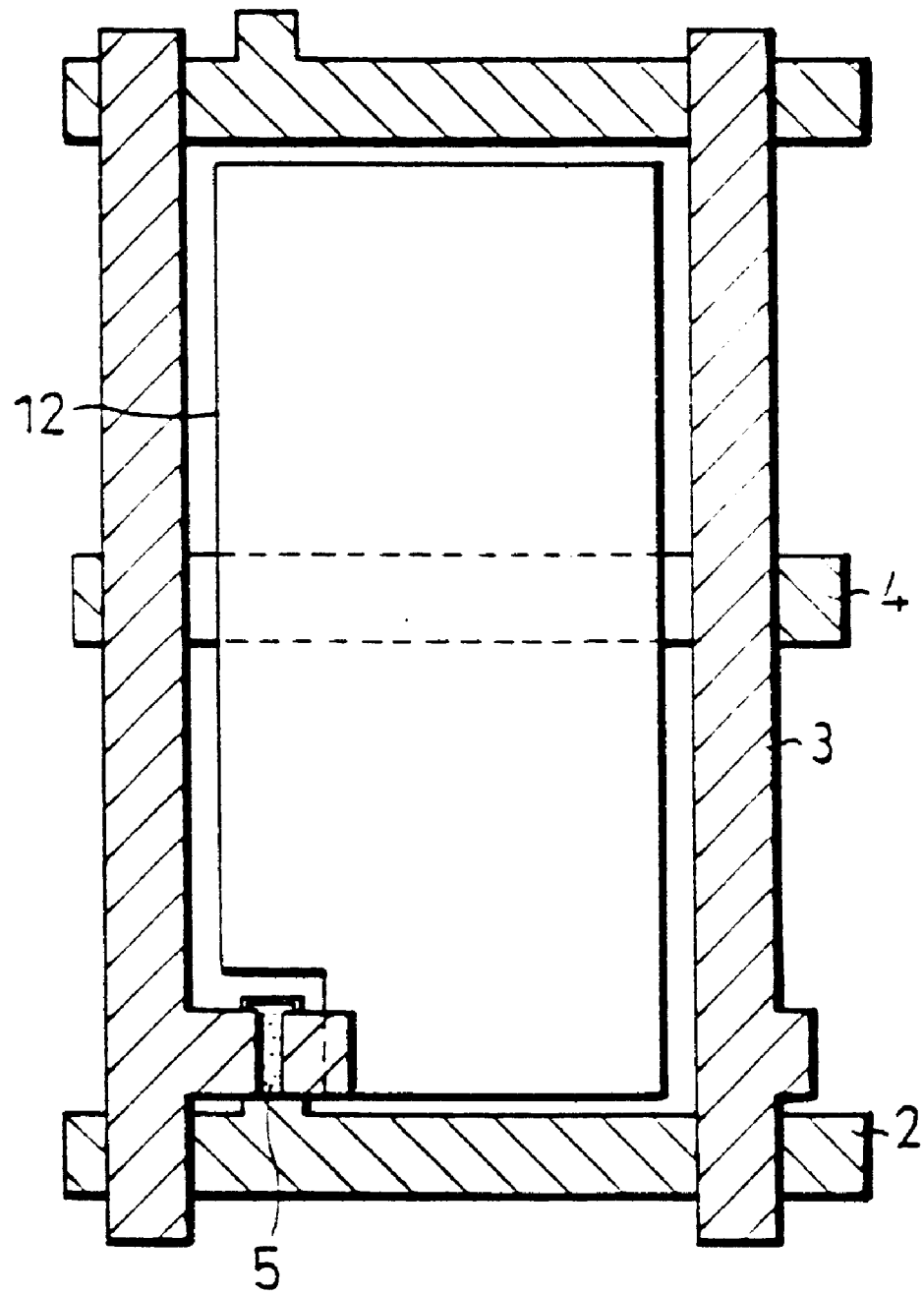
FIG. 9 is a plan view showing a structure of the Cs on Coma arrangement.
Figure 10:
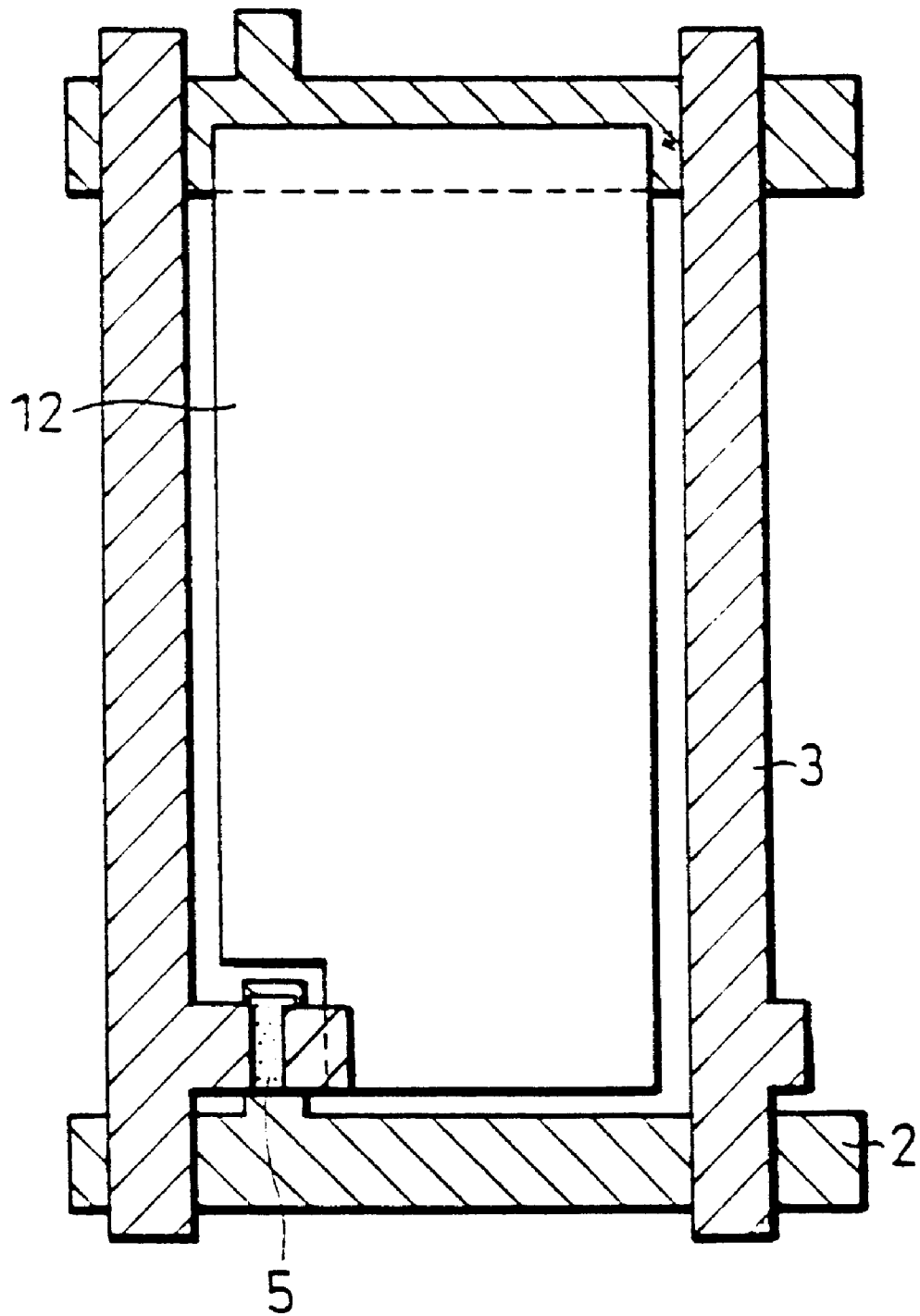
FIG. 10 is a plan view showing a structure of the Cs on Gate arrangement.

First, the gate line 2 and the gate electrode 6, and the Cs line 4 are provided simultaneously on the transparent insulating substrate 1a. Additional capacitance may be provided as shown in FIG. 9, where the Cs line 4 and the lower-layer pixel electrode 12 overlap (Cs on Coma), or it may be provided as shown in FIG. 10, where the lower-layer pixel electrode 12 overlaps gate line 2, which is provided on a different layer than the lower-layer pixel electrode 12 (Cs on Gate).

Next, the gate insulating film 7 is provided so as to cover the upper surfaces of the gate line 2, the gate electrode 6, and the Cs line 4. Alternatively, instead of providing the gate insulating film 7, the gate line 2, the gate electrode 6, and the Cs line 4 may be given an anodic oxide coating by the anodic oxidation method. In this way, a fine-grained coating can be obtained with fewer pinholes than an insulating film formed by sputtering or by the CVD method.

Next, the semiconductor layer 8 is provided so as to overlap the gate electrode 6, and the n⁻ —Si layers 9 are provided in sections so as to partially cover the semiconductor layer 8.

Next, after providing the lower-layer pixel electrode 12, the source line 3, the source electrode 10, and the drain electrode 11 of the TFT 5 are provided. In this way, if the lower-layer pixel electrode 12 and the source line 3 are to be manufactured of different materials, the source line 3 may be provided in two layers. For example, if the lower-layer pixel electrode 12 is to be of ITO, the first layer of the source line 3 may be of the ITO of the lower-layer pixel electrode 12, and then the second layer of the source line 3 may be provided of aluminum, tantalum, or another metal. By this means, the structure may be given redundancy, since it will not be subject to line breakage as long as the ITO and the metal are not broken at the same place. Simultaneous provision of the lower-layer pixel electrode 12 and the source line 3 using the same material is also possible. In this case, since the manufacturing process may be streamlined, lower costs and improved production efficiency become possible.

Next, the inter-layer insulating film 13 is provided on the source electrode 10, the drain electrode 11, and the lower-layer pixel electrode 12, and contact areas are provided by etching away the areas where the TFT 5 is to connect to the upper-layer pixel electrode 14 and to an exterior connection substrate (not shown). Next, by providing the upper-layer pixel electrode 14 on the inter-layer insulating film 13, the upper-layer pixel electrode 14 is connected through the contact area to the drain electrode 11 of the TFT 5. The holes 14a are then provided in the upper-layer pixel electrode 14. The active matrix substrate is provided as outlined above.

The opposing substrate is provided by layering on the transparent insulating substrate 1b the counter electrode 15 and an alignment film, in that order.

Finally, the space between the active matrix substrate and the opposing substrate is filled with the liquid crystal 16, and these two substrates are combined together.

Next, a method of inspecting the active matrix substrate described above will be explained with reference to FIGS. 11 and 12.

In the conventional structures, especially with high-resolution panels, leakage occurred between lines and pixel electrodes. This was especially likely with source lines which were on the same layer as the pixel electrodes. Of course, if the gate lines were on the same layer with the pixel electrodes, leakage was likely to occur with the gate lines. It is customary to repair such leaks by laser-cutting the leaking point, but if this repair is conducted after the transparent insulating film (corresponding to the inter-layer insulating film 13 in the present embodiment) is provided, the transparent insulating film may have sags due to the heat from the laser-cutting. These sags are of course especially marked when the transparent insulating film is made of organic resins with low heat resistance. There is the additional problem that debris left from the laser-cutting decrease display quality.

In the case of the present invention, inspection is performed after the source line 3 and the source electrode 10 and the drain electrode 11 of the TFT 5 have been provided as described above. This is done because damage to the materials is less if defects are discovered early, and the repairs are easier to perform at an early stage. For the present embodiment, the inspection is made using the voltage image method described below.

Figure 11:
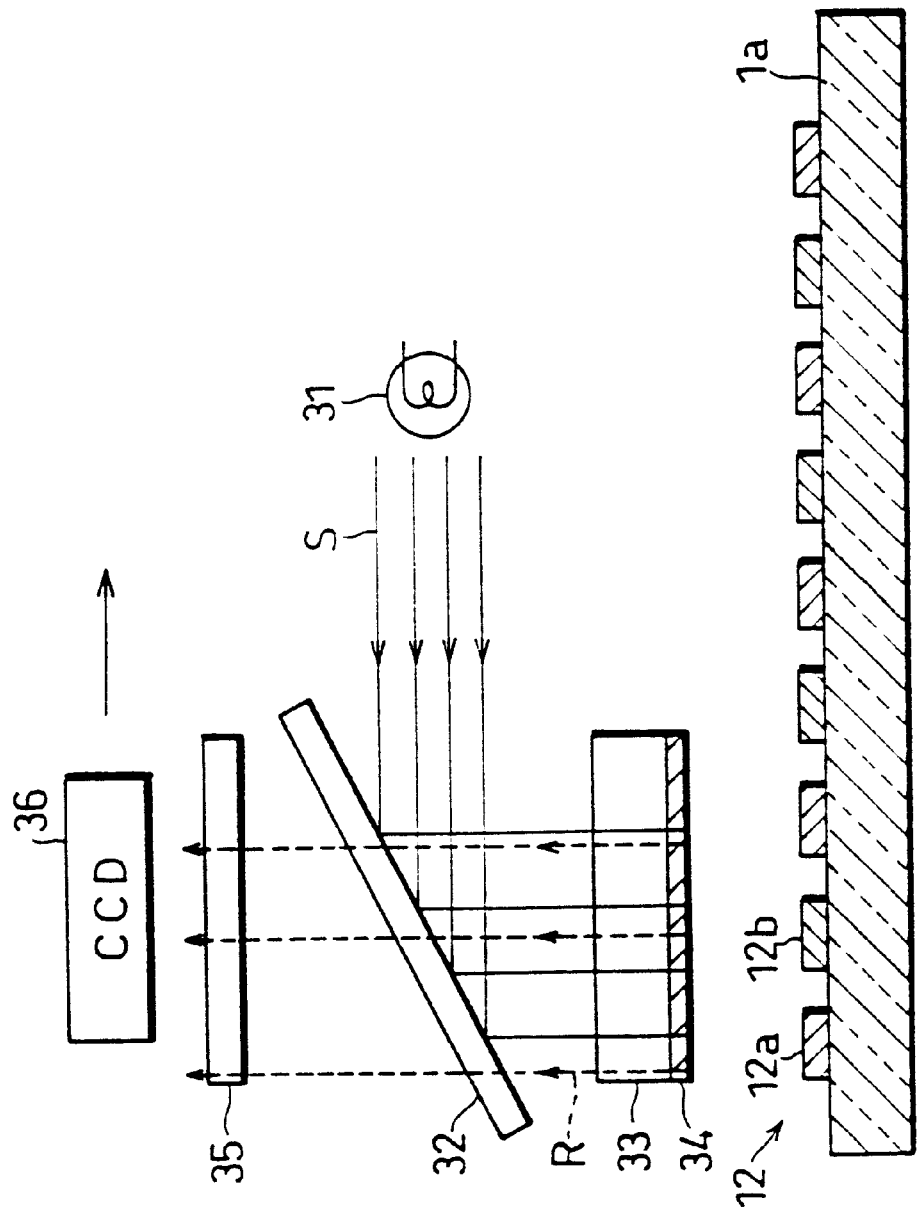
FIG. 11 is a structural diagram showing an inspection apparatus for the liquid crystal display device in the first embodiment of the present invention.

First, the drain electrode 11 and the lower-layer pixel electrode 12 are charged in response to a signal of positive or negative voltage (for example +20 V or −20 V) from the source line 3. In FIG. 11, 12a is a lower-layer pixel electrode 12 which is positively charged, and 12b is a lower-layer pixel electrode which is negatively charged.

The inspection apparatus is put in operation when the lower-layer pixel electrodes 12 have been charged as described above. Light S from lamp 31 of the inspection apparatus is reflected off a half-mirror 32 and projected into an optical modulating element 33 having a reflective plate 34.

The optical modulating element 33 is a Pockels element, which is a special crystal plate the refractive index of which changes according to the strength of the electric field at the place the Pockels element is located. For this reason, the polarization of reflected light R from the light S projected onto the reflective plate 34 changes according to the surface potential of the pixel beneath the optical modulating element 33.

Figure 12:
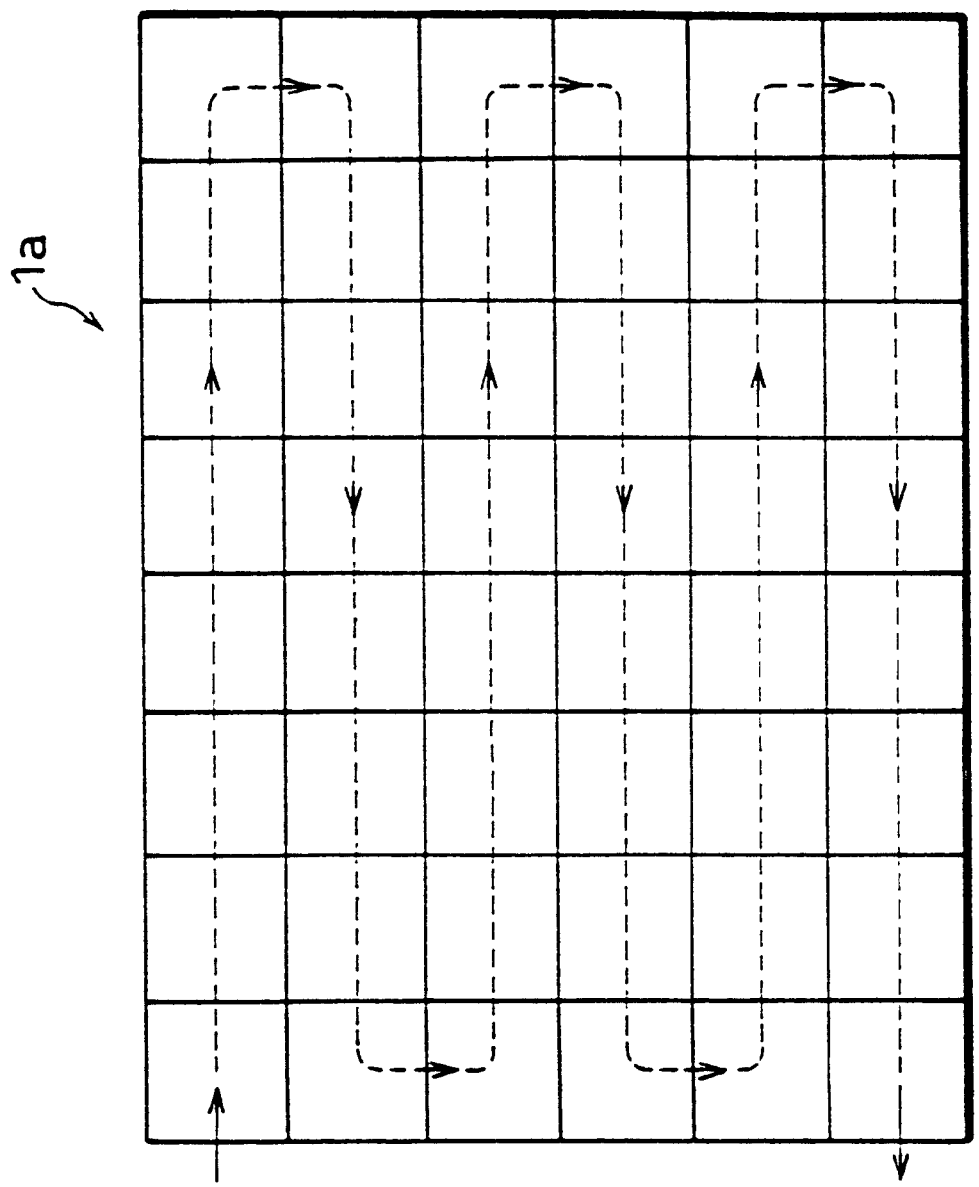
FIG. 12 is an explanatory diagram explaining an inspection method of the inspection apparatus shown in FIG. 11.
Figure 13:
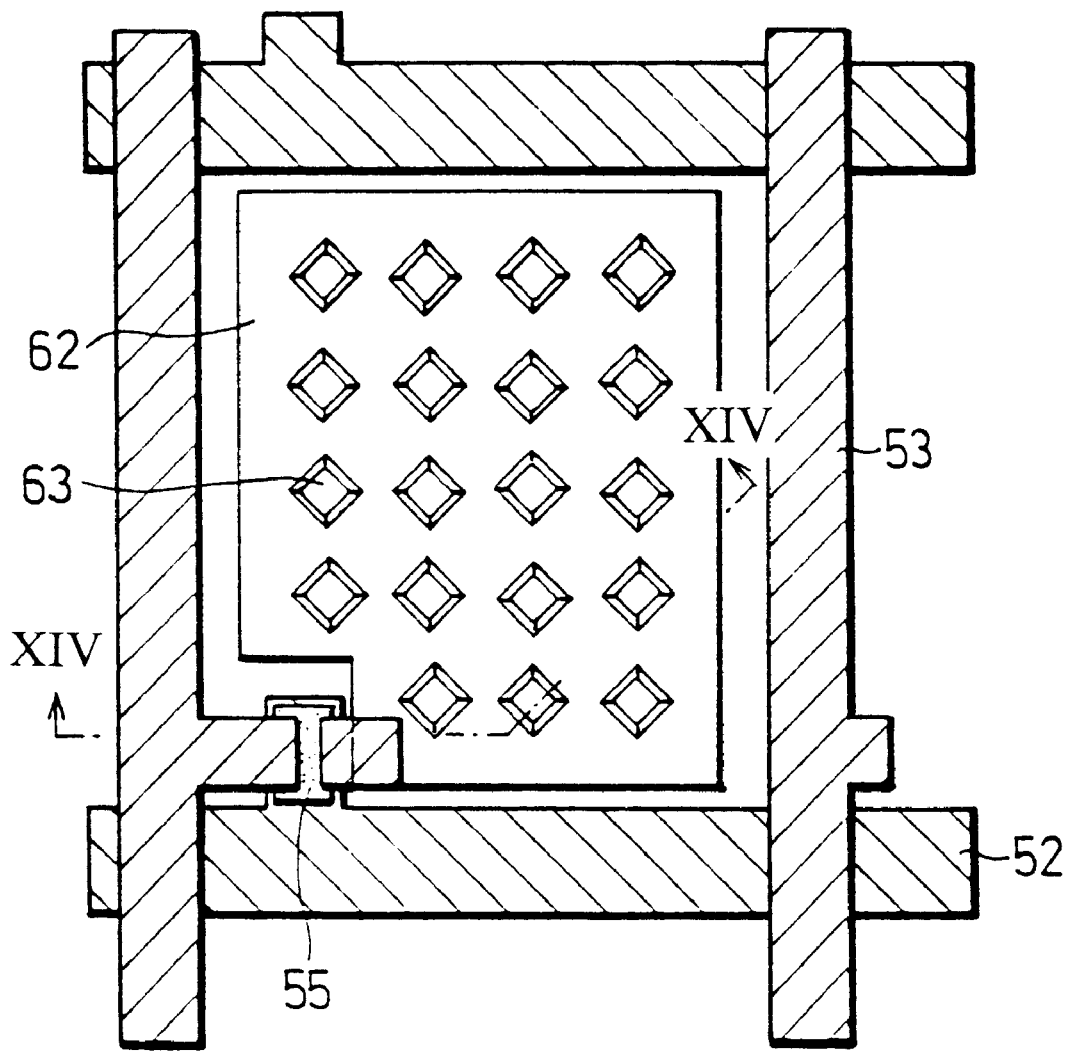
FIG. 13 is a plan view showing a structure of one pixel in an active matrix substrate of a conventional liquid crystal display device.

The reflected light R is picked up by a CCD 36 after the phased component of the reflected light R is removed by means of a quarter-wavelength plate 35. With this structure, the signal picked up can be treated as the pixel's surface potential. The result picked up by the CCD 36 is processed into an image, which is compared with a reference pattern to determine whether there are any leaks. The inspection described above can be carried out efficiently by dividing one transparent insulating substrate 1a into 8 columns and 6 rows, inspecting each box in one row, and then moving back in the other direction in the next row, as shown in FIG. 12.

If, as a result of the comparison mentioned above, any leaks are discovered, the location of each leak will also be clear, and repairs may be carried out by projecting YAG (Yttrium Aluminum Garnet) laser light onto the leaking point. Laser light with energy of $10^{-9}$ J/$\mu$m² to $10^{-6}$ J/$\mu$m² was used in these repairs. By projecting the laser light on the leaking point, the conductive material at that point is dispersed, and the area between source-bus lines can be made electrically insulated.

With the inspection method of the present embodiment, since the presence or absence of defects can be determined at an early stage, there is no use of extra materials, and decreased costs can be realized. Further, since repairs are easily performed at an early stage, repairs can also realize decreased costs.

[Second Embodiment]

Figure 4:
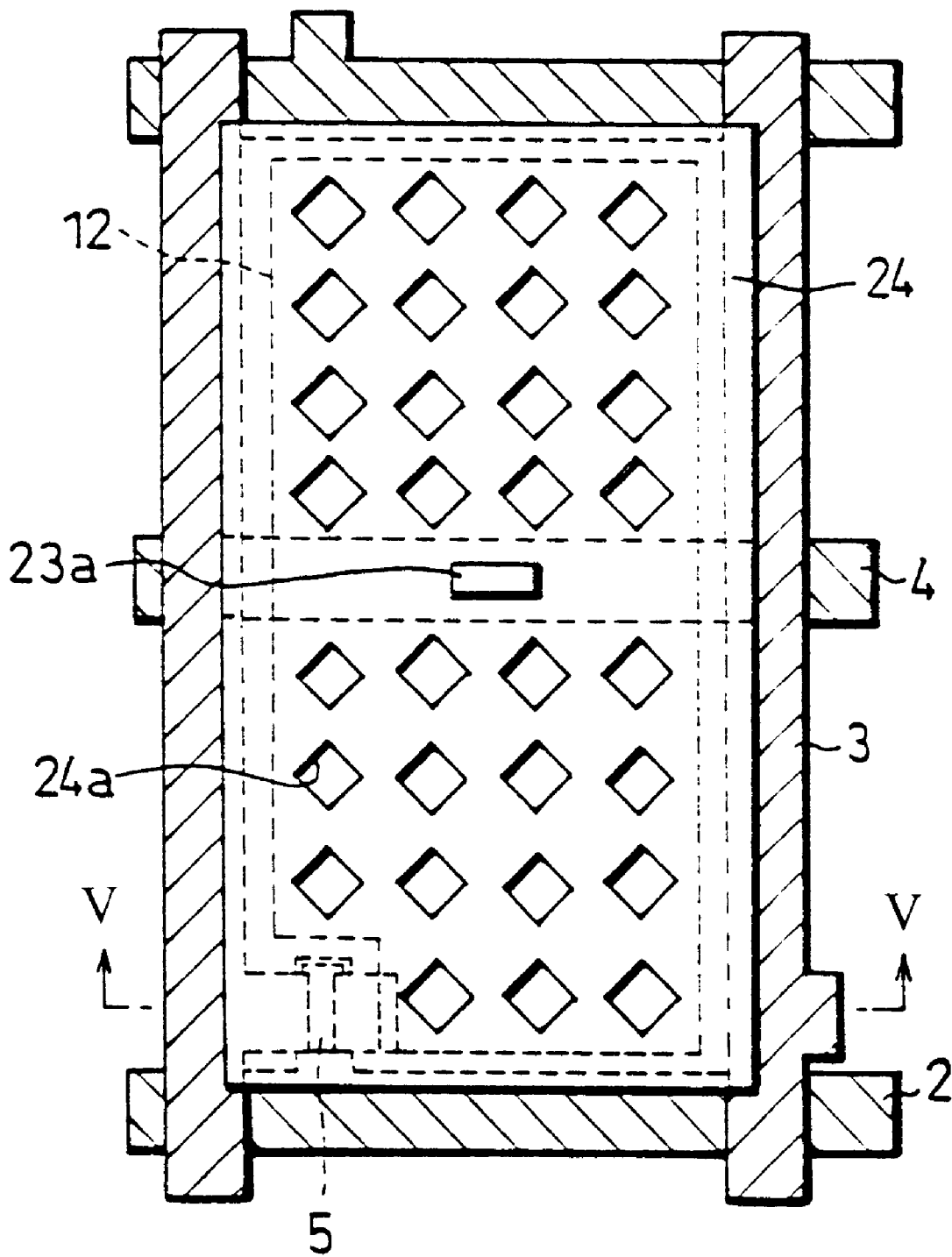
FIG. 4 is a plan view showing a structure of one pixel in an active matrix substrate of a liquid crystal display device in the second embodiment of the present invention.
Figure 5:
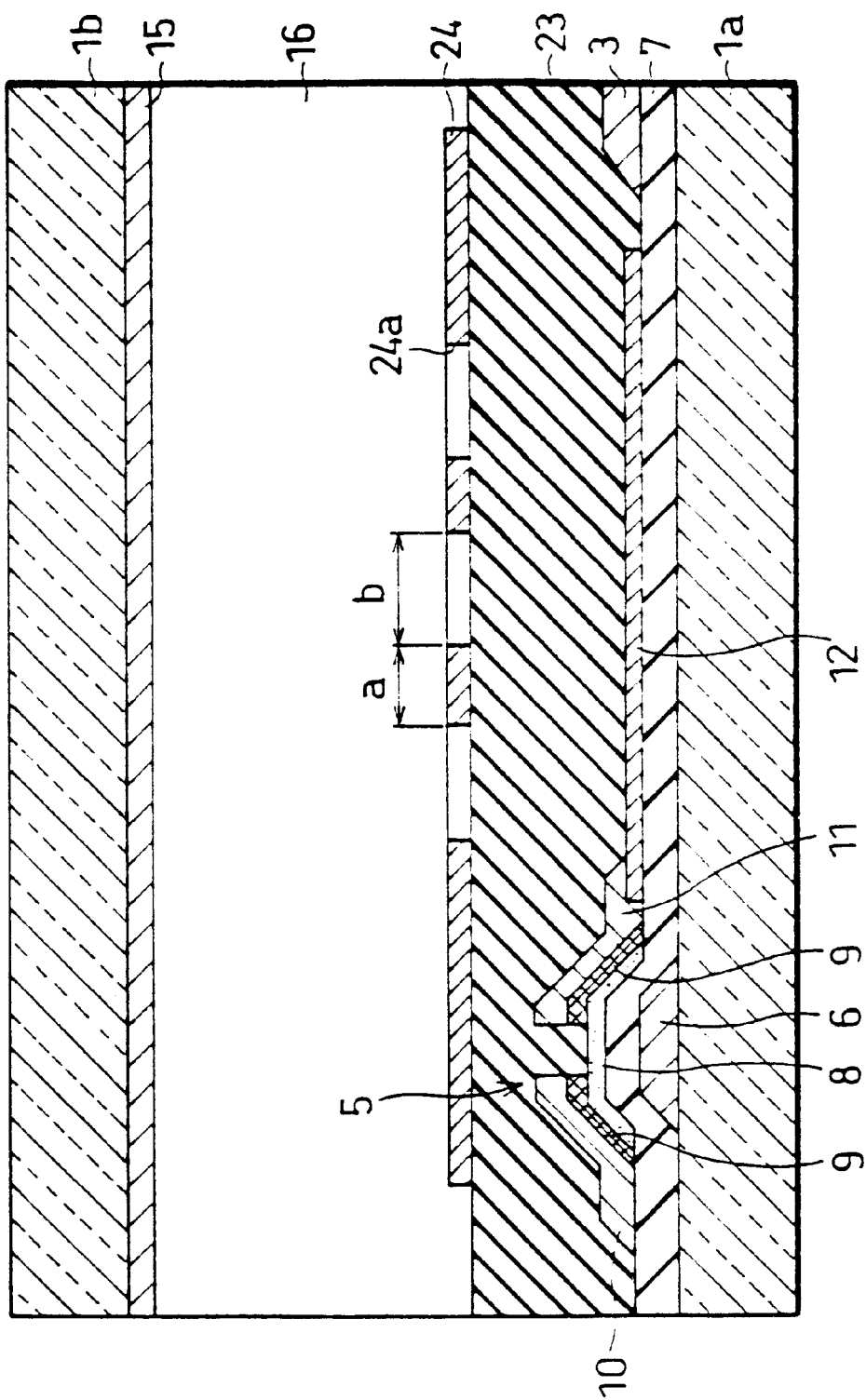
FIG. 5 is a sectional view taken on line V—V of the liquid crystal display device shown in FIG. 4.

The following is an explanation of the second embodiment of the present invention, with reference to FIGS. 4 and 5. In the interest of brevity, members which are the same as those shown in the Figures for the first embodiment will be marked with the same symbols, and explanation thereof will be omitted.

As shown in FIG. 5, the liquid crystal display device in the present embodiment is provided with an inter-layer insulating film 23 and an upper-layer pixel electrode 24 in place of the inter-layer insulating film 13 and the upper-layer pixel electrode 14 of the first embodiment, but is otherwise the same as that of the first embodiment.

The inter-layer insulating film 23, made of photosensitive acrylic resin (photosensitive organic film) of 1.5 $\mu$m thickness, is provided between the lower-layer pixel electrode 12 and the TFT 5 on the one hand and the upper-layer pixel electrode 24 on the other hand, and serves to insulate the lower-layer pixel electrode 12 from the upper-layer pixel electrode 24, and to insulate the source electrode 10 and the drain electrode 11 of the TFT 5 from the upper-layer pixel electrode 24.

The inter-layer insulating film 23 is provided by spin coating. Then, if a desired area of this acrylic resin is exposed to light and then developed in an alkaline solution, the exposed area alone will be etched by the alkaline solution, thus providing a contact hole 23a through the inter-layer insulating film 23. The contact hole 23a is provided above the Cs line 4.

The upper-layer pixel electrode 24 is made of a transparent conductive film of ITO or similar material 100 nm thick, and is layered on the inter-layer insulating film 23. The upper-layer pixel electrode 24 is provided so as to overlap the TFT 5, the source line 3, and the gate line 2.

The upper-layer pixel electrode 24 is connected to the lower-layer pixel electrode 12 through the hole 23a in the inter-layer insulating film 23, and thus is connected to the drain electrode 11 of the TFT 5. Further, a plurality of holes 24a are provided in the upper-layer pixel electrode 24. The holes 24a, for example a pattern of diamond-shaped holes as shown in FIG. 4, are provided over the entire surface of the upper-layer pixel electrode 24, which is provided above the place where the lower-layer pixel electrode 12 is provided. The size of each hole 24a depends on the size of the upper-layer pixel electrode 24, but is from several $\mu$m to several tens of $\mu$m.

The equivalent circuit for a liquid crystal display device with the structure outlined above, just as that in the first embodiment, is as shown in FIG. 3. Accordingly, as dictated by equations (2) and (4) in regard to the thickness, the dielectric constant, and the area of the inter-layer insulating film 23, if any two of these attributes are set, the third attribute will also be set. Thus the thickness of the inter-layer insulating film 23 can be adjusted by adjusting its dielectric constant and area. For this reason, in the liquid crystal display device in the present embodiment, a thick inter-layer insulating film 23 may be provided, thus making the alignment film above the various lines and above the TFT 5 flat, and improving display quality.

Further, in this structure, since the inter-layer insulating film 23 is made of acrylic resin or a similar organic film, a thick film can easily be provided by means of spin coating or a similar method. Since the inorganic film of silicon nitride or a similar material used in the first embodiment is provided by means of the P-CVD method or a similar method, the thicker the film is made, the more time is required, and productivity declines; but if an organic film is used, productivity is not decreased as much as with an inorganic film, even if the film is made thicker.

Since the inter-layer insulating film 23 is made of photosensitive resin, the photo-resist application process can be omitted, and the manufacturing process can be streamlined.

In addition, since the inter-layer insulating film 23 is thick, leakage between the lower-layer pixel electrode 12 and the source line 3 on the one hand and the upper-layer pixel electrode 24 on the other hand can be prevented even better than in the case of the first embodiment.

Since the contact hole 23a connecting the lower-layer pixel electrode 12 with the upper-layer pixel electrode 24 is provided above the Cs line 4, there is no decrease in display quality. In other words, since the place where the contact hole 23a is provided is naturally not flat, if the contact hole 23a is not provided above the Cs line 4, disturbance of alignment is likely to arise at the place where it is provided, thus allowing the light to leak through, thereby decreasing the display quality. However, since the present structure hides the place with the Cs line 4, the display quality is maintained. This is true not only for the Cs on Com arrangement, but also for the Cs on Gate arrangement, in which case the contact may be provided above the neighboring gate line.

Incidentally, a phenomenon sometimes occurs when current is being conducted whereby a charge is drawn to the interface where the inter-layer insulating film 23 and the alignment film meet, and the inter-layer insulating film 23 becomes charged. When this kind of phenomenon occurs, the TFT 5 becomes charged when the TFT 5 is OFF, and the current leaks between the source and drain electrodes, thus decreasing the display quality. However, since the structure of the liquid crystal display device in the present embodiment is such that the upper-layer pixel electrode 24 overlaps the TFT 5, the charge is released to the upper-layer pixel electrode 24 above the TFT 5, and the charging phenomenon mentioned above can be held to a minimum. As a result, the deterioration of the OFF characteristic of the TFT 5 can be avoided, and a highly reliable liquid crystal display device becomes possible. Since the charging phenomenon mentioned above is more likely to occur when the inter-layer insulating film 23 is an organic film than when it is an inorganic film, and more likely to occur during aging and other high-temperature operations, the present structure is especially effective in such situations.

In addition, since in the conventional structures there was a small space between the pixel electrode and the lines, the provision of a BM (Black Matrix) or other light shield layer on the opposing substrate side was necessary; but since in the present structure the upper-layer pixel electrode 24 is provided so as to overlap the source line 3 and the gate line 2, there is no need to provide a light shield layer on the opposing substrate side. Accordingly, production efficiency can be improved and costs can be decreased.

Further, the poor precision of combining the opposing substrate with the active matrix substrate in the conventional structures required that the light shield layer and the pixel electrode be overlapped in the amount of the imprecision (several $\mu$m), thus decreasing the aperture rate; but since in the present structure there is no need to allow a margin for imprecision, the aperture rate can be increased. As a result, increased brightness or decreased power consumption can be realized.

In this case, since the inter-layer insulating film 23 is thick, parasitic capacitance can be minimized even if the upper-layer pixel electrode 24 is overlapped with the source line 3 and/or the gate line 2.

Next, as with the first embodiment, the results of a performance evaluation of a liquid crystal display device having the structure described above are shown in Table 1 above. The liquid crystal material and the alignment film material used here were both the same as those used in the first embodiment.

As a result, it was found that the liquid crystal display device in this embodiment has a greater voltage difference than does the first embodiment, without giving rise to disturbance of alignment, and that cell gap is easily obtained.

Further, the effective voltage at area a' of Comparative Examples 1 and 2, at area a of the first embodiment, and at area a of this embodiment were all the same, but since the aperture rate has been increased, the amount of backlight can be decreased, thus allowing a decrease in power consumption. For example, it was found that in an 11.3-type SVGA, the aperture rate of the conventional structures was 65%, but that of the present structure is 85%, and in a 12.1-type XGA, the aperture rate of the conventional structures was 60%, but that of the present structure is 80%.

In this second embodiment, acrylic resin was used for the inter-layer insulating film 23, but there is no need to be limited to this material. However, a material with a low dielectric constant and high transparency (in concrete terms, light transmittance of 90% or more in the visible spectrum) is preferred for the inter-layer insulating film 23. For example, polyamide imide ($\in_p$=3.5 to 4.0), polyallylate ($\in_p$=3.0), polyether imide ($\in_p$=3.2), epoxy ($\in_p$=3.5 to 4.0), a polyimide with high transparency ($\in_p$=3.0 to 3.4; for example diamine combined with an acid anhydride containing hexafluoropropylene), or a similar material may be used.

Figure 6:
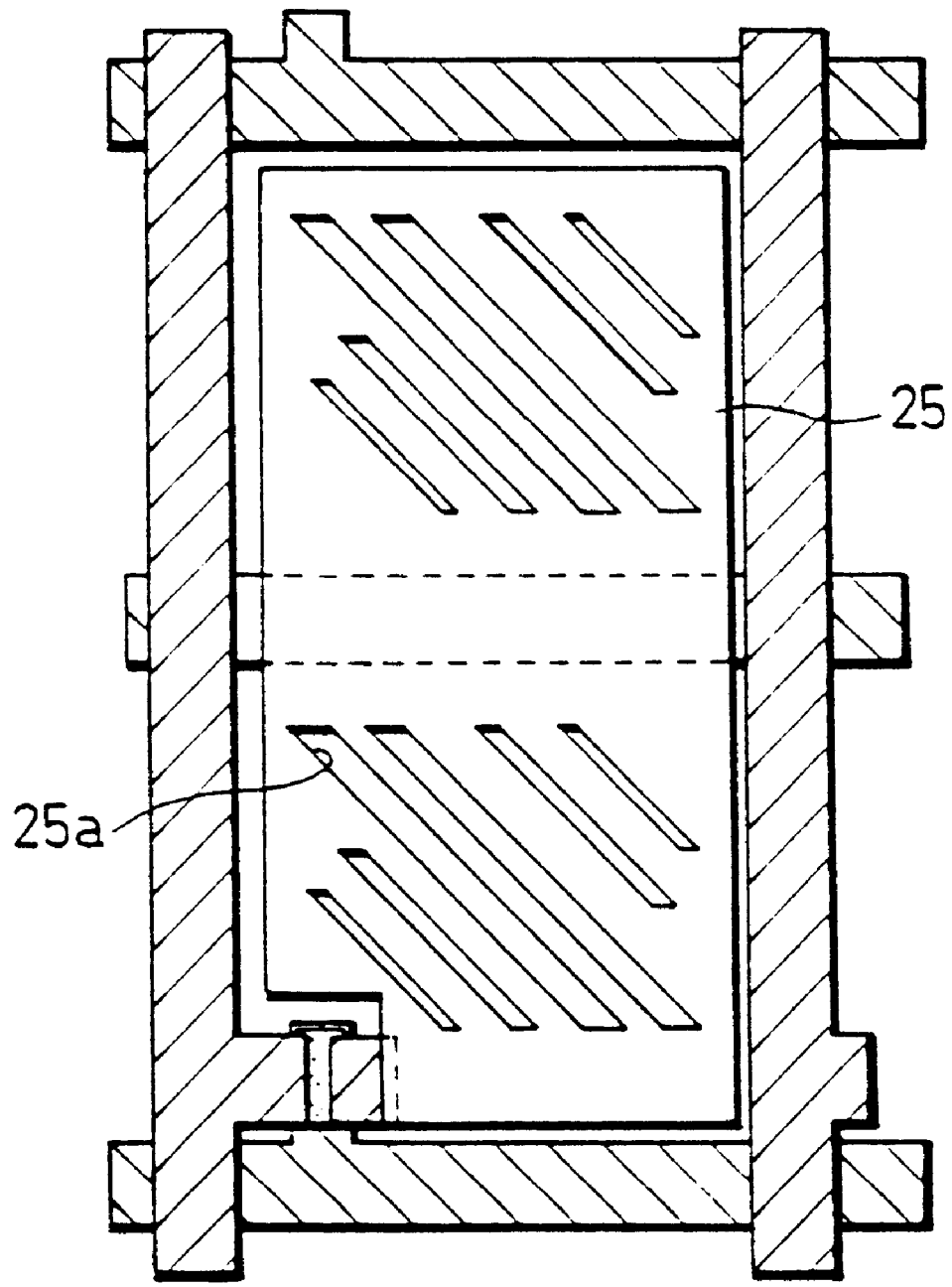
FIG. 6 is a plan view showing another structure for pixel electrodes on the uppermost layer in a liquid crystal display device.
Figure 7:
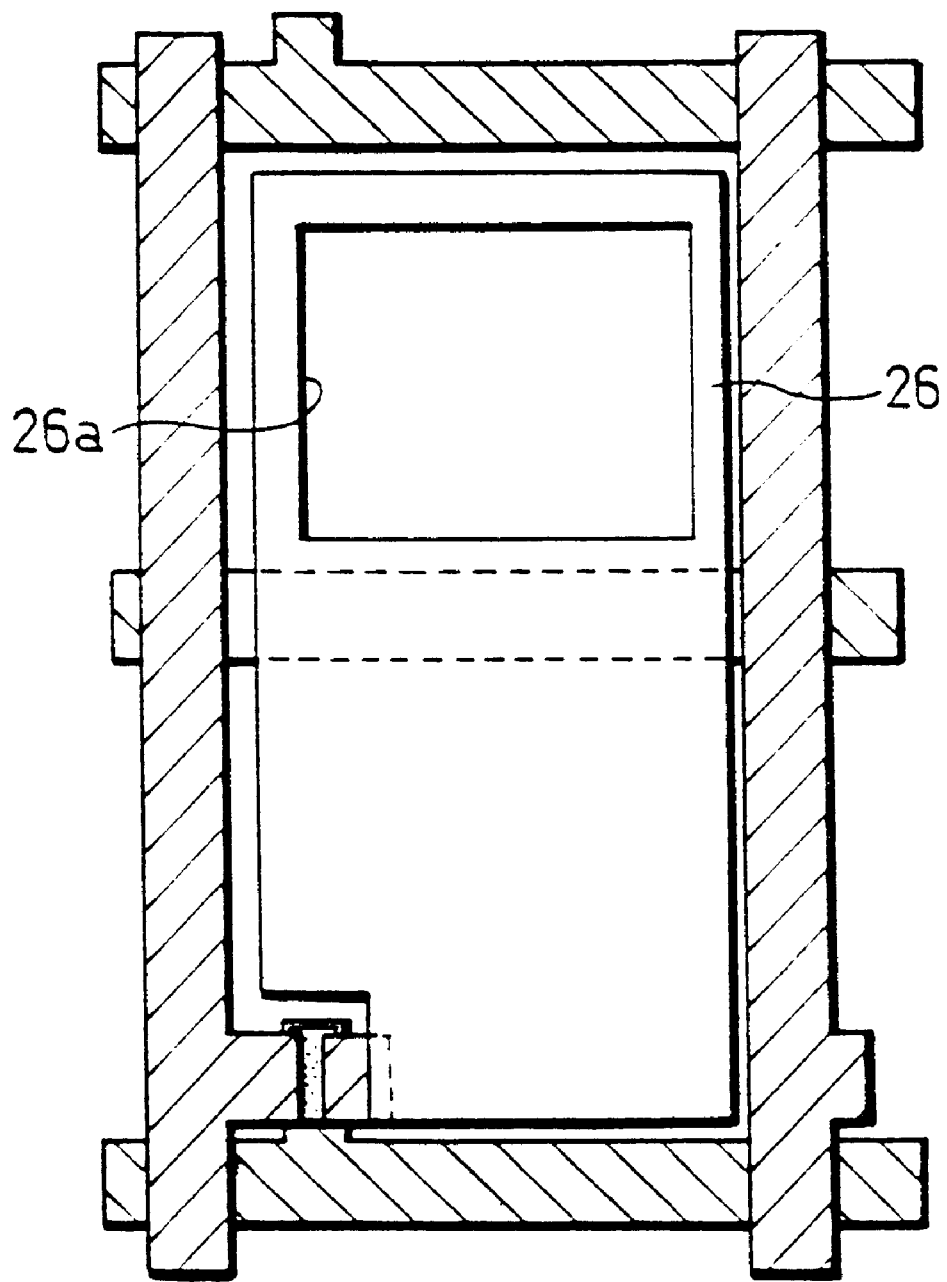
FIG. 7 is a plan view showing a further structure for pixel electrodes on the uppermost layer in a liquid crystal display device.
Figure 8:
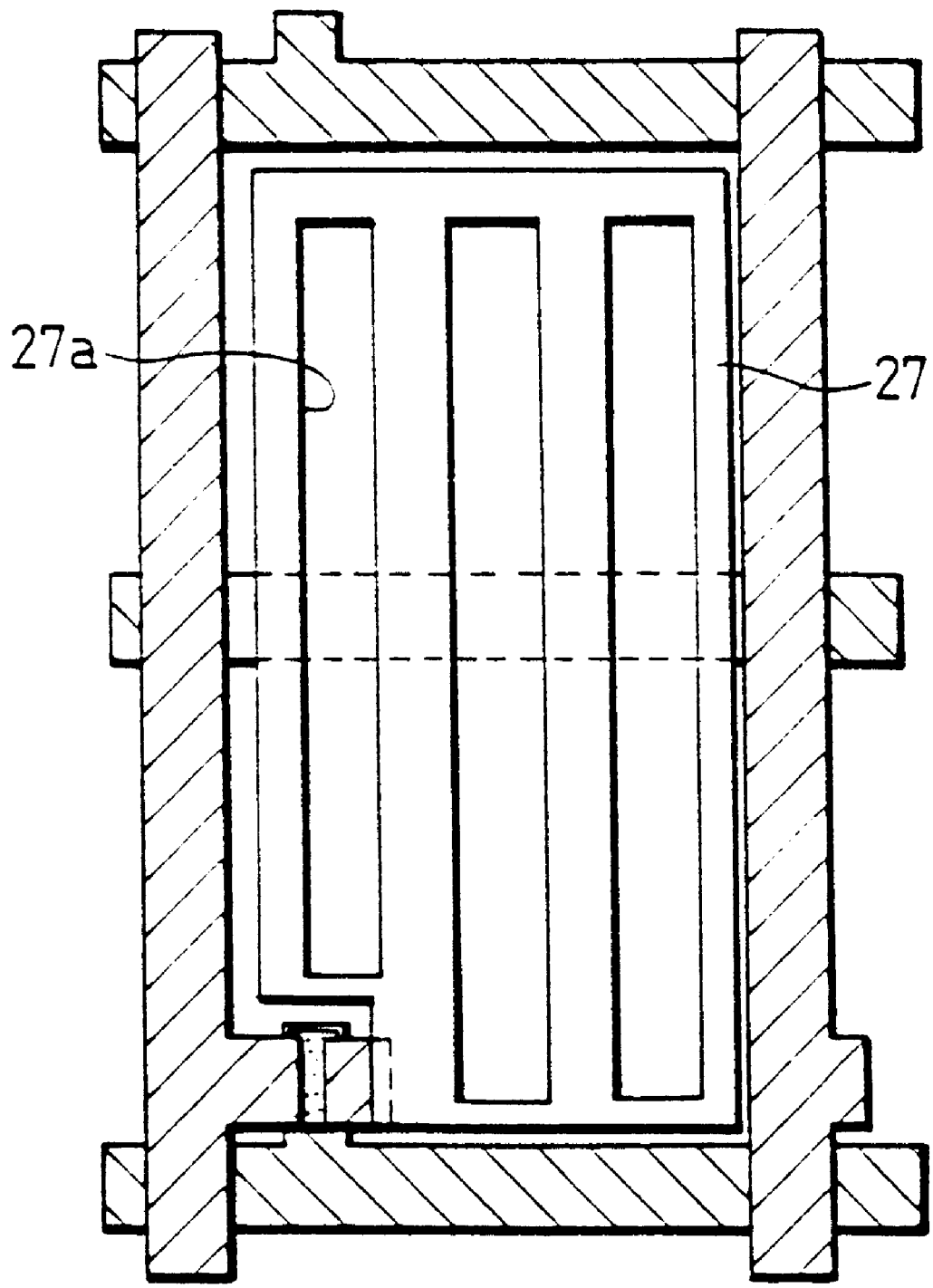
FIG. 8 is a plan view showing yet a further structure for pixel electrodes on the uppermost layer in a liquid crystal display device.

In both the first and second embodiments, an arrangement of diamond-shaped holes was used for the holes in the upper-layer pixel electrode, but there is no need to be limited to this arrangement. For example, other possibilities may be effected such as an arrangement wherein the holes 25a in an upper-layer pixel electrode 25 are diagonal stripes (slits) (see FIG. 6), an arrangement wherein a single large hole 26a is provided in the upper half of an upper-layer pixel electrode 26 (see FIG. 7), and an arrangement wherein the holes 27a in an upper-layer pixel electrode 27 are vertical stripes (slits) (see FIG. 8).

However, the area of the inter-layer insulating film (the area of the holes) must have a certain proportion to the area of the upper-layer pixel electrode (the area other than the holes). This proportion should be set so that widening of the viewing angle can be achieved through the mixture, in the human eye, of the information from the part with holes with that from the part without holes.

Forming the holes in the same direction as the rubbing direction is advantageous because defects from rubbing will not occur. For example, in the case of the arrangement of diamond-shaped holes in FIG. 2, rubbing is performed in a 45-degree angle direction (parallel to the sides of the diamond shapes). Further, the small holes 14a in FIG. 2 are preferable to the single large hole 26a in FIG. 7, because each hole will not be noticeable. A hole size of 50 $\mu$m square or less is preferable.

The first and second embodiments used a two-layer pixel electrode structure of upper- and lower-layer pixel electrodes, but the same effect may be obtained by using a pixel electrode structure of three or more layers. Again, the lower-layer pixel electrode was provided over the entirety of the gate insulating film, but the same effect may be obtained by providing the lower-layer pixel electrode so as to nest with the upper-layer pixel electrode.

[Third Embodiment]

Figure 16:
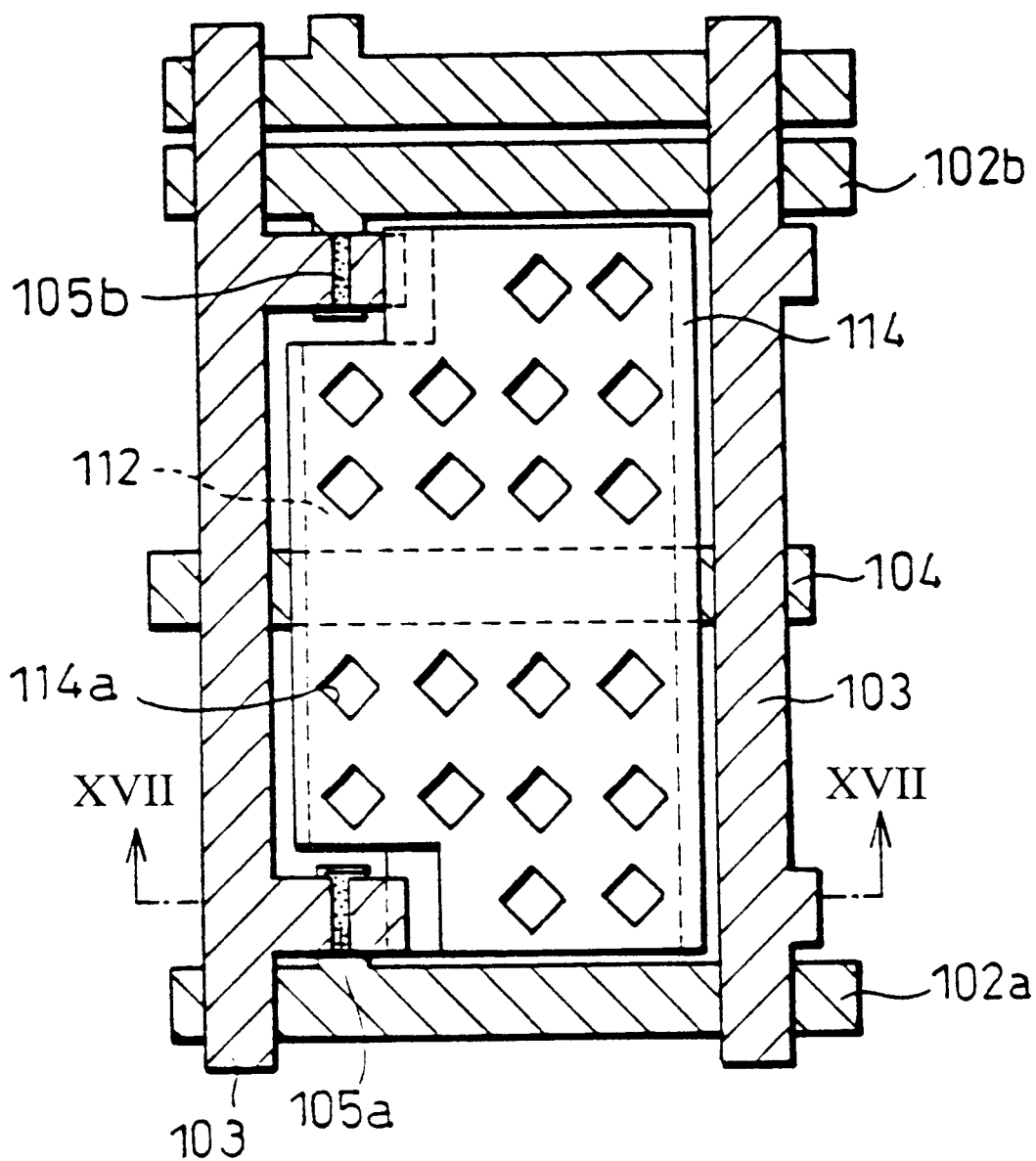
FIG. 16 is a plan view showing a structure of one pixel in an active matrix substrate of a liquid crystal display device in the third embodiment of the present invention.
Figure 17:
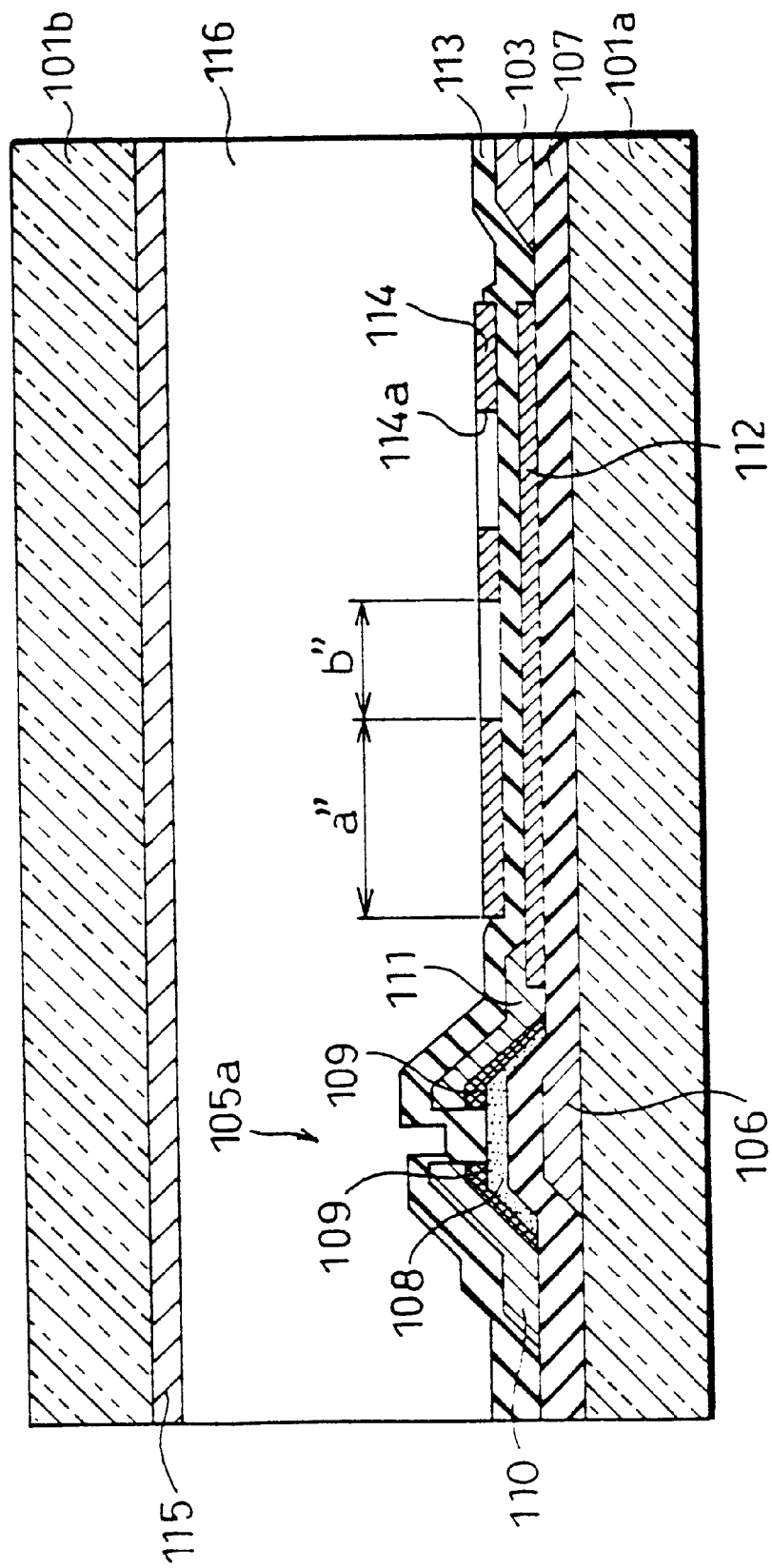
FIG. 17 is a sectional view taken on line XVII—XVII of the liquid crystal device shown in FIG. 16.

The following will explain the third embodiment of the present invention with reference to FIGS. 3, 16 and 17.

The liquid crystal display device in the present embodiment, as shown in FIG. 16, is provided with gate lines 102a and 102b as scanning lines, source lines 103 as signal lines, and a additional capacitance (Cs) line 104. The Cs line 104 serves to create additional capacitance at the places where it overlaps with a lower-layer pixel electrode 112 mentioned below (Cs on Com arrangement), and is provided at the same time as the gate lines 102a and 102b.

The rectangular space bordered by gate lines 102a and 102b and source lines 103 corresponds to one pixel, and TFTs 105a and 105b are provided as switching elements adjacent to the intersections of source line 103 with gate lines 102a and 102b respectively.

As shown in FIG. 17, the TFT 105a is composed of the following layered on a transparent, insulating substrate 101a of glass or similar material: a gate electrode 106, a gate insulating film 107, a semiconductor layer 108, an n$^+$ —Si layer 109, a source electrode 110, and a drain electrode 111.

The gate electrode 106 is made of tantalum, aluminum, or similar material of 300 nm thickness, and is connected to the gate line 102a.

On the gate line 102a, the gate electrode 106, and the Cs line 104, the gate insulating film 107 is provided of silicon nitride (SiN$_x$) or similar material of 350 nm thickness. Alternatively, instead of providing the gate insulating film 107, the gate line 102a, the gate electrode 106, and the Cs line 104 may be given an anodic oxide coating by the anodic oxidation method. In this way, a fine-grained coating can be obtained with fewer pinholes than an insulating film formed by sputtering or by the CVD method.

On the gate insulating film 107, the semiconductor layer 108 is provided of amorphous silicon or similar material of 100 nm thickness, and is provided to overlap the gate electrode 106.

The n$^+$ —Si layers 109 are made of $\mu$c –n$^+$—Si or similar material of 80 nm thickness, and are provided as an ohmic contact in sections to partially cover the semiconductor layer 108.

On one of the n$^+$ —Si layers 109, the source electrode 110 is provided of tantalum, aluminum, ITO, or similar material of 300 nm thickness, and is connected to the source line 103.

On the other n$^+$ —Si layer 109, the drain electrode 111 is provided of tantalum, aluminum, ITO, or similar material of 300 nm thickness, and is connected to a lower-layer pixel electrode 112 mentioned below.

The TFT 105b has the same structure as the TFT 105a described above, except that its drain electrode is connected to an upper-layer pixel electrode 114 instead of to a lower-layer pixel electrode 112 (both mentioned below; see FIG. 16).

Further, the pixel area within the rectangular area is provided with, layered on the gate insulating film 107, a lower-layer pixel electrode 112, an inter-layer insulating film 113, and an upper-layer pixel electrode 114.

When the liquid crystal display device is of the transmittance type, the lower-layer pixel electrode 112 is made of a transparent conductive film such as ITO or another similar material of 100 nm thickness, and is connected to the drain electrode 111 of the TFT 105a. When the liquid crystal display device is of the reflective type, the lower-layer pixel electrode 112 may be made of a highly reflective metal such as aluminum of 100 nm thickness.

The inter-layer insulating film 113, made of silicon nitride of 500 nm thickness, is provided between the lower-layer pixel electrode 112 and the upper-layer pixel electrode 114, and insulates the two pixel electrode layers from each other. Further, the inter-layer insulating film 113 also covers and protects the TFTs 105a and 105b.

The upper-layer pixel electrode 114, made of a transparent conductive film such as ITO or another similar material of 50 nm thickness, is layered on the inter-layer insulating film 113. The upper-layer pixel electrode 114 is provided so that its outer edges extend beyond those of the lower-layer pixel electrode 112. Further, a plurality of holes 114a are provided in the upper-layer pixel electrode 114. The holes 114a, for example a pattern of diamond-shaped holes as shown in FIG. 16, are provided at a plurality of places evenly across the upper-layer pixel electrode 114 above the place where the lower-layer pixel electrode 112 is provided. The size of each hole 114a depends on the size of the upper-layer pixel electrode 114, but is from several $\mu$m to several tens of $\mu$m.

At the time of providing the inter-layer insulating film 113, contact areas are provided by etching away (1) the contact holes for connecting the TFT 105b to the upper-layer pixel electrode 114, and (2) connecting areas for connection to an exterior connection substrate (not shown). Thus when the upper-layer pixel electrode 114 is provided on the inter-layer insulating film 113, the upper-layer pixel electrode 114 will be connected through the contact area to the drain electrode of the TFT 105b.

Here, the source electrodes 110 and the drain electrodes 111 of the TFTs 105a and 105b, and the source line 103, are provided after the provision of the lower-layer pixel electrode 112. In this way, if the lower-layer pixel electrode 112 and the source line 103 are to be manufactured of different materials, the source line 103 may be provided in two layers. For example, if the lower-layer pixel electrode 112 is to be made of ITO, the first layer of the source line 103 may be made of the ITO of the lower-layer pixel electrode 112, and then the second layer of the source line 103 may be made of aluminum, tantalum, or another metal. By this means, the structure may be given redundancy, since it will not be subject to line breakage as long as the ITO and the metal are not broken at the same place. Simultaneous provision of the lower-layer pixel electrode 112 and the source line 103 using the same material is also possible. In this case, since the manufacturing process may be streamlined, lower costs and improved production efficiency become possible.

On the upper-layer pixel electrode 114 and the inter-layer insulating film 113 covering the TFTs 105a and 105b, an alignment film of 50 nm thickness is provided (not shown). The active matrix substrate containing the TFTs 105a and 105b (the first substrate) is structured as described above.

Provided opposite the active matrix substrate structured as described above is an opposing substrate (the second substrate), which is composed of counter electrodes 115 and an alignment film (not shown), layered in that order on a transparent insulating substrate 101b.

The liquid crystal display device in the present embodiment is completed by filling the space between the active matrix substrate and the opposing substrate with liquid crystal 116.

Next the driving of the liquid crystal display device with the structure described above will be explained.

By selectively supplying driving signals sent from the gate lines 102a and 102b to the TFTs 105a and 105b, the liquid crystal display device can be given a wide viewing angle for use in the office, at presentations, etc., and a narrow viewing angle to keep others from seeing the screen for use in aircraft, trains, etc.

First, in order to select a wide viewing angle, an ON signal is supplied to both the gate line 102a and the gate line 102b, thus driving both TFT 105a and TFT 105b simultaneously. In this state, the image signal from the source line 103 is supplied to the lower-layer pixel electrode 112 through the TFT 105a, and a common image signal is supplied to the upper-layer pixel electrode 114 through the TFT 105b. Then, by supplying an OFF signal to the TFTs 105a and 105b, a charge is maintained in the liquid crystal 116 between the counter electrode 115 and the lower-layer pixel electrode 112 or the upper-layer pixel electrode 114.

The upper-layer pixel electrode 114 is provided with the holes 114a. For this reason, at area a", where the upper-layer pixel electrode 114 is provided above the lower-layer pixel electrode 112 (where no holes 114a are provided), the voltage of the upper-layer pixel electrode 114 is directly applied. Accordingly, the equivalent circuit at area a" is as shown in FIG. 3 at (a), and the effective voltage $V_{LC}$ of the liquid crystal 116 at area a" is as shown by equation (1) of the first embodiment.

Here, $C_1$ is the capacitance of the alignment film on the opposing substrate side, $C_2$ is the capacitance of the alignment film on the active matrix substrate side, $C_{LC}$ is the capacitance of the liquid crystal 116, and $V_{ap}$ is the applied voltage. $C_s$ on FIG. 3 is the additional capacitance of the Cs line 104.

When the area of the alignment films (S) is held constant, and both alignment films are made of the same material, then, by substitution of the capacitance equation specified in the first embodiment for equation (1) mentioned above, the effective voltage $V_{LC}$ at area a" is as shown in equation (2) mentioned in the first embodiment.

Here, $\in_{or}$ is the dielectric constant of the alignment film material, $\in_{LC}$ is the dielectric constant of the liquid crystal 116, $d_1$ is the thickness of the alignment film on the opposing substrate side, $d_2$ is the thickness of the alignment film on the active matrix side, and $d_{LC}$ is the effective cell gap of the liquid crystal 116.

On the other hand, at area b", where the upper-layer pixel electrode 114 is not provided above the lower-layer pixel electrode 112 (where the holes 114a are provided), the equivalent circuit will be as shown in FIG. 3 at (b), and thus at area b" a divided capacitance voltage of the serial capacitance of the capacitance $C_p$ of inter-layer insulating film 113 and the capacitance $C_{LC}$ of liquid crystal 116 is applied. Accordingly, at area b", the effective voltage $V_{LC}$ of the liquid crystal 116 is as shown in equation (3) mentioned in the first embodiment.

Substituting the capacitance equation for equation (3) as in the case of area a", the effective voltage $V_{LC}$ at area b" is as shown in equation (4) mentioned in the first embodiment. Here, $\in_p$ is the dielectric constant of the inter-layer insulating film 113, and $d_p$ is the thickness of the inter-layer insulating film 113.

As can be seen from equations (1) through (4), even though a common image signal is being applied, the voltage applied to the liquid crystal 116 (the effective voltage $V_{LC}$) differs at area a" and area b". In this way, areas are created within the same pixel where the effective voltage $V_{LC}$ of the liquid crystal 116 differs, and therefore two domains are created within the same pixel where the threshold characteristics of the liquid crystal molecules differ, i.e., where the light transmittance of the liquid crystal 116 differs. Accordingly, the viewing angle characteristics when the screen of the liquid crystal display device is viewed from the side can be improved. In other words, the wide viewing angle needed for regular use in the office and for presentations can be obtained.

Here, the places where the image signal is applied directly are those where the upper-layer pixel electrode 114 is provided on the inter-layer insulating film 113 (area a"), and the places where a divided capacitance voltage is applied are those where there are holes 114a in the upper-layer pixel electrode 114 (area b"). Therefore, if the thickness $d_p$, the dielectric constant $\in_p$, and the area (the area of the holes 114a) of inter-layer insulating film 113 are adjusted, it is possible to regulate the effective voltage $V_{LC}$ in accordance with the mere presence or absence of the upper-layer pixel electrode. Accordingly, the unevenness of the surface of the alignment film on the upper-layer pixel electrode 114 is only as thick as the upper-layer pixel electrode 114 (approximately 50 nm), and with this surface being for the most part flat, the disturbance of alignment can be held to a minimum. As a result, a liquid crystal display device with good display quality can be obtained.

In order to select a narrow viewing angle, the TFT 105a is driven in response to an ON signal supplied to the gate line 102a only. In other words, no ON signal is sent to the gate line 102b, and the TFT 105b is not driven. In this state, the image signal from the source line 103 will be sent to the lower-layer pixel electrode 112 through the TFT 105a. Then, in response to an OFF signal to the TFT 105a, a charge is maintained in the liquid crystal 116 between the counter electrode 115 and the lower-layer pixel electrode 112. Accordingly, an effective voltage $V_{LC}$ equivalent to that at area b" is applied to all of the liquid crystal 116 within the pixel, and a narrow viewing angle can be attained. In short, a display with the narrow viewing angle needed for use in aircraft, trains, etc. can be obtained.

As explained above, the liquid crystal display device in this embodiment has a structure which provides, in each pixel, (1) the TFT 105a, connected to the lower-layer pixel electrode 112 and operated by the gate line 102a, and (2) the TFT 105b, connected to the upper-layer pixel electrode 114 and operated by the gate line 102b, so that whether to apply a common image signal to both pixel electrodes, or only to the lower-layer pixel electrode 112 can be alternatively selected, thereby enabling change of the viewing angle characteristics.

In other words, since the pixel electrodes within each pixel are individually controlled by an equal number of TFTs 105a and 105b and gate lines 102a and 102b, the image signal from the source line 103 can be selectively sent to the pixel electrodes on the different layers. For example, if the TFTs 105a and 105b are turned on, the image signal is sent to the pixel electrodes on the different layers, and, with domains being provided within the same pixel where the voltage applied to the liquid crystal differs, a wide viewing angle is enabled; but if only the TFT 105a connected to the pixel electrode 112 on the lowest layer is turned on, with the applied voltage being equal throughout the pixel, a narrow viewing angle is enabled. In this way, with almost no increase in costs, a light, thin, low-power-consumption liquid crystal display device can be realized.

Further, in the active matrix substrate in the present embodiment, the upper-layer pixel electrode 114 is put in place only after the inter-layer insulating film 113 has been provided on the source line 102, the TFTs 105a and 105b, and the lower-layer pixel electrode 112, so even if the upper-layer pixel electrode is provided close to or even slightly overlapping the source line 103 or the TFT 105a or 105b, leakage will not occur. Again, although the lower-layer pixel electrode 112 and the source line 103 are provided on the same layer, the inter-layer insulating film 113 is also provided between the lower-layer pixel electrode 112 and the source line 103, so leakage will not occur here either.

In short, since in the conventional structures the pixel electrode and the source line were provided on the same layer, bringing them too close together led to leakage and a marked impairment of quality, but in the present structure, quality can be improved, since leakage is not likely to occur even if the upper-layer pixel electrode 114 and the source line 103 are provided close to each other. The same effect can be obtained in cases where the pixel electrode and the gate electrode are provided on the same layer.

In addition, since the edges of the upper-layer pixel electrode 114 extend beyond those of the lower-layer pixel electrode 112, and no holes 114a are provided in the portion of the upper-layer pixel electrode 114 extending beyond the lower-layer pixel electrode 112, the aperture rate of the liquid crystal display device is determined by the size of the upper-layer pixel electrode 114. Since decreasing the size of the lower-layer pixel electrode 112 does not decrease the aperture rate, more space can be allowed between the lower-layer pixel electrode 112 and the source line 103. As a result, further prevention of leakage between the lower-layer pixel electrode 112 and the source line 103 becomes possible, and a liquid crystal display device with a high aperture rate can be effectively provided.

In this embodiment, the pixel electrodes were provided in two layers, but a structure with pixel electrodes in three or more layers, with multistage change of the viewing angle, is also possible. For example, with pixel electrodes in three layers, holes should be provided in the pixel electrodes other than that on the lowest layer, with three TFTs provided and each connected to a pixel electrode on a different layer, and a gate line connected to each TFT. In this case, the image signal can, based on the driving signals from two gate lines, be applied to the pixel electrodes on the lowest and uppermost layers, or to pixel electrodes on the lowest and middle layers, or, based on the driving signal from a single gate line, the image signal can be applied to the pixel electrode on the lowest layer only, and by means of this selection, the viewing angle can be changed in three stages.

[Fourth Embodiment]

The fourth embodiment of this invention will be explained below. In the interest of brevity, members which are the same as those shown in the Figures for the embodiments above will be marked with the same symbols, and explanation thereof will be omitted.

In the third embodiment, a structure was described whereby each TFT was connected to a single pixel electrode, the gate lines 102a and 102b and the TFTs 105a and 105b being used for a wide viewing angle, and the gate line 102a and the TFT 105a being used for a narrow viewing angle. However, the present embodiment has a structure in which the gate line 102b and the TFT 105b are used for a wide viewing angle, and the gate line 102a and the TFT 105a are used for a narrow viewing angle. In other words, the TFT 105a is connected only to the lower-layer pixel electrode 112, while the TFT 105b is connected to both the lower-layer pixel electrode 112 and the upper-layer pixel electrode 114.

With this structure, the TFTs 105a and 105b within each pixel are controlled individually by an equal number of gate lines 102a and 102b. If an ON signal is applied to the gate line 102b only, a common image signal is applied to both the lower-layer pixel electrode 112 and the upper-layer pixel electrode 114, thus enabling a wide viewing angle; but if an ON signal is sent to the gate line 102a only, the image signal is applied only to the lower-layer pixel electrode 112, thus enabling a narrow viewing angle. By this means, the same effect as that of the third embodiment can be obtained, but in the vicinity of the TFT 105b, the edges of the upper-layer pixel electrode 114 can be extended beyond those of the lower layer pixel electrode 112, thus enabling further improvement in the aperture rate.

In the present embodiment, the pixel electrodes were provided in two layers, but a structure with pixel electrodes in three or more layers, with multistage change of the viewing angle, is also possible. For example, with pixel electrodes in three layers, holes should be provided in the pixel electrodes other than that on the lowest layer, with the first TFT connected to the pixel electrodes on the lowest and uppermost layers, the second TFT connected to the pixel electrodes on the lowest and middle layers, and the third TFT connected only to the pixel electrode on the lowest layer. A gate line is then connected to each TFT. In this case, by applying an ON signal to one of the three gate lines, one of the three TFTs can be driven, thus supplying a common image signal to the pixel electrodes on the lowest and uppermost layers, or to pixel electrodes on the lowest and middle layers, or to the pixel electrode on the lowest layer only, and by means of this selection, the viewing angle can be changed in three stages.

[Fifth Embodiment]

The fifth embodiment of the present invention will be explained below with reference to FIG. 18. In the interest of brevity, members which are the same as those shown in the Figures for the embodiments above will be marked with the same symbols, and explanation thereof will be omitted.

Figure 18:
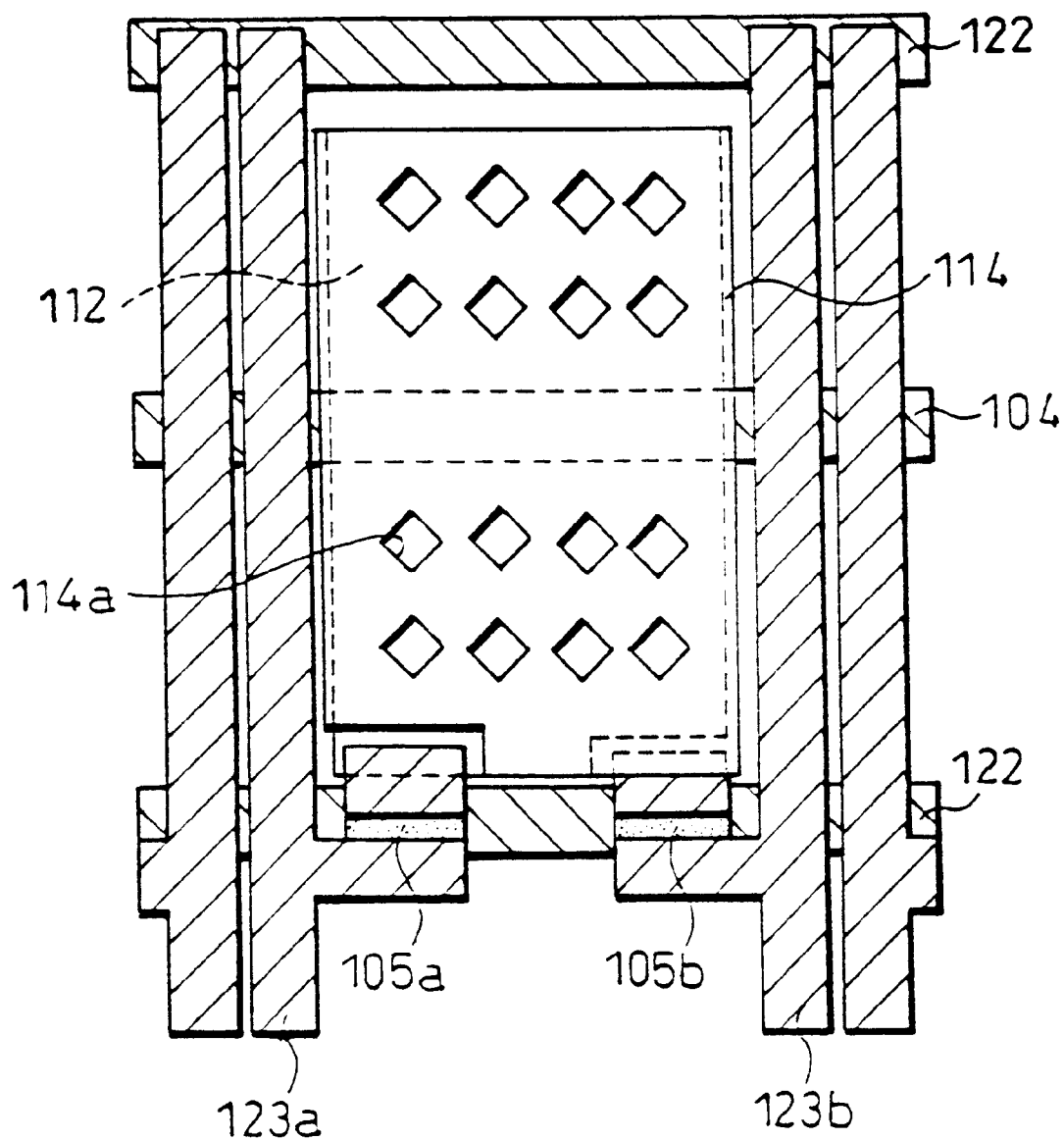
FIG. 18 is a plan view showing a structure of one pixel in an active matrix substrate of a liquid crystal device in the fifth embodiment of the present invention.

As shown in FIG. 18, the liquid crystal display device in this embodiment is provided with a gate line 122 and source lines 123a and 123b instead of gate lines 102a and 102b and source line 103, but otherwise has the same structure as the liquid crystal display device in the third embodiment.

The rectangular space bordered by the gate line 122 and the source lines 123a and 123b corresponds to one pixel, and the TFTs 105a and 105b, provided in the vicinity of the intersections of the gate line 122 with the source lines 123a and 123b, respectively, are connected to the source lines 123a and 123b, respectively. Here, the TFTs 105a and 105b are provided above the gate line 122, but, as in the third embodiment, a spur can be provided in the gate line 122, and the TFTs 105a and 105b can be provided above the spur.

In a liquid crystal display device with the structure described above, by selectively applying the image signals sent from the source lines 123a and 123b to the lower-layer pixel electrode 112 and the upper-layer pixel electrode 114, the liquid crystal display device can be given a wide viewing angle for use in the office, at presentations, etc., and a narrow viewing angle to keep others from seeing the screen, for use in aircraft, trains, etc.

First, in order to select a wide viewing angle, an ON signal is sent to the gate line 122, driving the TFTs 105a and 105b. In this state, the image signal from the source line 123a is sent to the lower-layer pixel electrode 112 through the TFT 105a, and the image signal from the source line 123b is sent to the upper-layer pixel electrode 114 through the TFT 105b. Assume that the image signals from the source lines 123a and 123b are a common signal. Then, by applying an OFF signal to the TFTs 105a and 105b, a charge is maintained in the liquid crystal 116 between the counter electrode 115 and the lower-layer pixel electrode 112 or the upper-layer pixel electrode 114.

Since the upper-layer pixel electrode 114 is provided with the holes 114a, even if a common image signal is simultaneously applied to both of the pixel electrodes, the effective voltage of the liquid crystal 116 differs for the different areas. If areas within the same pixel are provided where the applied voltage of the liquid crystal 116 differs, two domains are created within the same pixel where the threshold characteristics of the liquid crystal molecules differ, i.e., where the light transmittance of the liquid crystal 116 differs. Accordingly, the viewing angle characteristics when the screen of the liquid crystal display device is viewed from the side can be improved. In short, the wide viewing angle needed for regular use in the office and for presentations can be obtained.

Next, in order to select a narrow viewing angle, an ON signal is applied to the gate line 122, as above, driving the TFTs 105a and 105b. In this state, the image signal from the source line 123a is input to the lower-layer pixel electrode 112 through the TFT 105a. The source line 123b is left open by applying no image signal thereto, thus leaving the upper-layer pixel electrode with no image signal applied thereto. Then, by applying an OFF signal to the TFTs 105a and 105b, a charge is maintained in the liquid crystal 116 between the counter electrode 115 and the lower-layer pixel electrode 112. Accordingly, the same effective voltage is applied to all of the liquid crystal 116 within the pixel, and a narrow viewing angle can be attained. In short, display with the narrow viewing angle needed for use in aircraft, trains, etc. can be obtained.

As explained above, the liquid crystal display device in this embodiment has a structure which provides, in each pixel, (1) the TFT 105a, connected to the lower-layer pixel electrode 112 and operated by the gate line 102a, and (2) the TFT 105b, connected to the upper-layer pixel electrode 114 and operated by the gate line 102b, so that it can be selected whether to apply a common image signal to both pixel electrodes, or only to the lower-layer pixel electrode 112, thereby enabling change of the viewing angle characteristics, just as in the third embodiment.

In other words, since the TFTs 105a and 105b within each pixel are controlled by a single gate line 122, but are connected to different source lines 123a and 123b, the image signals from the source lines 123a and 123b can be sent independently to the pixel electrodes on the different layers. For example, if the image signals from the source lines 123a and 123b are a common signal, areas are provided within the same pixel where the voltage applied to the liquid crystal differs, and a wide viewing angle is enabled, but if an image signal is sent only to the pixel electrode on the lowest layer, the applied voltage is equal throughout the pixel, and a narrow viewing angle is enabled. In this way, with almost no increase in costs, a light, thin, low-power-consumption liquid crystal display device can be realized.

In the present embodiment, the pixel electrodes were provided in two layers, but a structure with pixel electrodes in three or more layers, with multistage change of viewing angle, is also possible. For example, with pixel electrodes in three layers, holes should be provided in the pixel electrodes other than that on the lowest layer, with three TFTs provided and each connected to a pixel electrode on a different layer, and a source line connected to each TFT. In this case, a common image signal can be input from two source lines to the pixel electrodes on the lowest and uppermost layers, or to the pixel electrodes on the lowest and middle layers, or, the image signal can be input from one source line to the pixel electrode on the lowest layer only, and by means of this selection, the viewing angle can be changed in three stages.

[Sixth Embodiment]

The sixth embodiment of the present invention will be explained below. In the interest of brevity, members which are the same as those shown in the Figures for the embodiments above will be marked with the same symbols, and explanation thereof will be omitted.

The fifth embodiment had a structure in which the holes 114a were provided in the upper-layer pixel electrode 114 only, and in which, for wide viewing angle, a common image signal was sent to the upper-layer pixel electrode 114 and the lower-layer pixel electrode 112, and for narrow viewing angle, the image signal was sent to the lower-layer pixel electrode 112 only. However, in the present embodiment, holes are provided not only in the upper-layer pixel electrode 114, but also in the inter-layer insulating film 113.

The holes in the inter-layer insulating film 113 are provided in the same places as the holes 114a in the upper-layer pixel electrode 114. These holes in the inter-layer insulating film 113 can be provided easily and with no increase in costs if they are provided by the same process as that for making the contact areas described in the third embodiment. Alternatively, the holes in the inter-layer insulating film 113 may be provided by etching, after the holes 114a are provided in the upper-layer pixel electrode 114, and after masking the upper-layer pixel electrode 114.

With this structure, in order to select a wide viewing angle, an ON signal is first sent to the gate line 122, thus driving the TFTs 105a and 105b. In this state, the image signal from the source line 123a is sent to the lower-layer pixel electrode 112 through the TFT 105a, and the image signal from the source line 123b is sent to the upper-layer pixel electrode 114 through the TFT 105b. Here the image signal from the source line 123a is processed by an exterior circuit, and is thus different from the image signal from the source line 123b. Then, an OFF signal is sent to the TFTs 105a and 105b, so that a charge is maintained in the liquid crystal 116 between the counter electrode 115 and the lower-layer pixel electrode 112 or the upper-layer pixel electrode 114.

Since the holes 114a are provided in the upper-layer pixel electrode 114, and holes are also provided in the inter-layer insulating film 113, there is no influence from the inter-layer insulating film 113 at either the places where the holes 114a are provided or at the places where they are not provided. A voltage calculated by equation (4) mentioned in the third embodiment is applied to the lower-layer pixel electrode 112 as the image signal from the source line 123a, and the same image signal as that in the fifth embodiment is sent to the upper-layer pixel electrode 114 as the image signal from the source line 123b, thus creating areas within the same pixel where the effective voltage of the liquid crystal 116 differs. Thus, two domains are created within the same pixel where the threshold characteristics of the liquid crystal molecules differ, i.e., where the light transmittance of the liquid crystal 116 differs. Accordingly, the viewing angle characteristics when the screen of the liquid crystal display device is viewed from the side can be improved. In short, the wide viewing angle needed for regular use in the office and for presentations can be obtained.

In order to select a narrow viewing angle, the image signal from the source line 123a is the same as that from the source line 123b, so that the same voltage is applied to all of the liquid crystal 116 within the same pixel, and a narrow viewing angle can be attained. In short, a display with the narrow viewing angle needed for use in aircraft, trains, etc. can be obtained.

As explained above, the liquid crystal display device in this embodiment has a structure which provides, in each pixel, (1) the TFT 105a, connected to the source line 123a, and (2) the TFT 105b, connected to the source line 123b, so that it can be selected whether to apply two different image signals, one of which is processed by an external circuit, to both pixel electrodes, or to apply a common image signal to both pixel electrodes, thereby enabling change of the viewing angle characteristics, just as in the third embodiment. In this way, with almost no increase in costs, a light, thin, low-power-consumption liquid crystal display device can be realized. In this case, the external circuit mentioned above is not especially complex, so there will be little cost increase due to the circuit.

In the present embodiment, the pixel electrodes were provided in two layers, but a structure with pixel electrodes in three or more layers, with multistage change of viewing angle, is also possible. For example, with pixel electrodes in three layers, holes should be provided in the pixel electrode on the uppermost layer and at the corresponding places in the inter-layer insulating film immediately beneath it, and holes should be provided in the pixel electrode on the middle layer and at the corresponding places in the inter-layer insulating film immediately beneath it. Three TFTs should be connected to the respective pixel electrodes on the different layers, and a source line is connected to each TFT. In this case, it is selected whether to send different image signals to the respective pixel electrodes on the different layers, or to send a different image signal to the pixel electrode on the uppermost layer only, or to send a common image signal to the respective pixel electrodes on the different layers, so that the viewing angle can be changed in three stages. Note that when the pixel electrodes are provided on three or more layers, the holes in the pixel electrode on the uppermost layer and in the inter-layer insulating film immediately beneath it should be larger than the holes in the pixel electrode on the middle layer.

[Seventh Embodiment]

The seventh embodiment of the present invention will be explained below with reference to FIG. 22. In the interest of brevity, members which are the same as those shown in the Figures for the embodiments above will be marked with the same symbols, and explanation thereof will be omitted.

Figure 22:
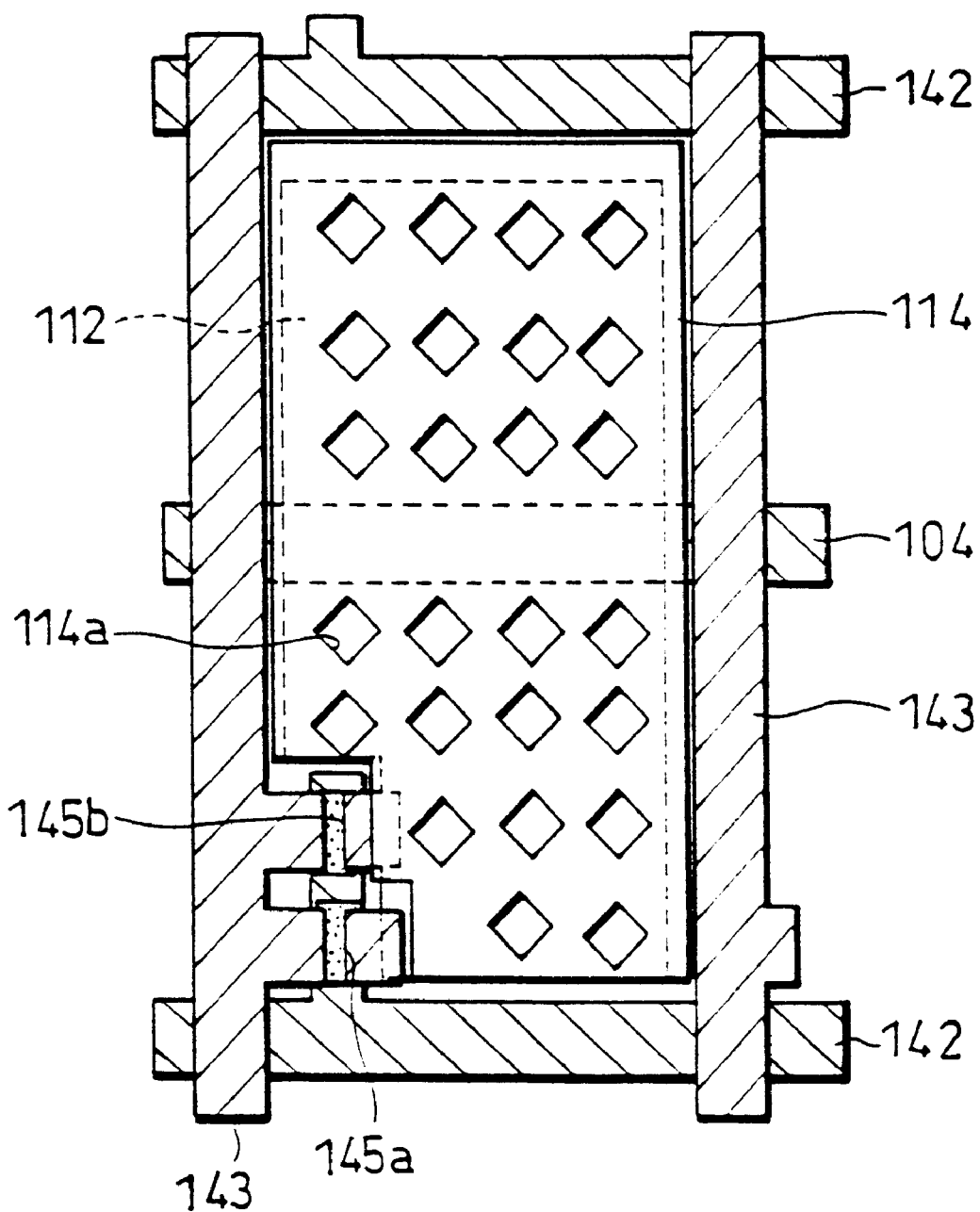
FIG. 22 is a plan view showing a structure of one pixel in an active matrix substrate of a liquid crystal display device in the seventh embodiment of the present invention.

The third through sixth embodiments above had structures in which two source lines or two gate lines were provided to correspond to two TFTs, but the present embodiment has a structure in which, as shown in FIG. 22, two TFTs 145a and 145b are driven by a single gate line 142 and a single source line 143.

The ohmic contact layer of the TFT 145a is a p-type semiconductor of $\mu c$ -$p^+$ —Si or a similar material, and the drain electrode of the TFT 145a is connected to the lower-layer pixel electrode 112. The ohmic contact layer of the TFT 145b is an n-type semiconductor of $\mu c$ -$n^+$ —Si or a similar material, and the drain electrode of the TFT 145b is connected both to the lower-layer pixel electrode 112 and to the upper-layer pixel electrode 114.

A p-type semiconductor is turned ON when the driving signal is negative, and an n-type semiconductor is turned ON when the driving signal is positive. Therefore, in order to select a wide viewing angle, a positive voltage of, for example, +15 V is applied to the gate line 142, applying a common image signal to both the lower-layer pixel electrode 112 and the upper-layer pixel electrode 114. In order to select a narrow viewing angle, on the other hand, a negative voltage of, for example, −15 V is applied to the gate line 142, applying the image signal to the lower-layer pixel electrode 112 only.

As explained above, the liquid crystal display device in this embodiment has a structure which provides, in each pixel, (1) the TFT 145a, and (2) the TFT 145b, each of which has a different threshold voltage, so that whether to apply a common image signal simultaneously to the pixel electrodes on both layers, or to apply the image signal to the lower-layer pixel electrode 112 only can be alternatively selected, thereby enabling change of the viewing angle characteristics, just as in the third embodiment.

In other words, since the threshold voltage differs for the TFT 145a and the TFT 145b, it is possible to control and drive the TFT 145a and the TFT 145b in response to a single driving signal. For example, if the TFTs 145a and the TFTs 145b are turned ON, the image signal is applied to the pixel electrodes on a plurality of layers, and different areas are provided within the same pixel where the voltage applied to the liquid crystal differs, thus enabling a wide viewing angle; whereas if only the TFT 145a (which is connected to the lower-layer pixel electrode 112) is turned ON, the same voltage is applied to all of the liquid crystal in the pixel, thus enabling a narrow viewing angle.

In this way, with almost no increase in costs, a light, thin, low-power-consumption liquid crystal display device can be realized. The present embodiment requires a separate process for providing the ohmic contact layer, but since there need not be as many lines as in the third through sixth embodiments, there is the benefit of increased aperture rate.

In cases where there is some time to spare in the writing to the pixel electrodes (in panels which are not of very high definition), a structure may be used in which one TFT is connected to the lower-layer pixel electrode (or upper-layer pixel electrode) only, and the other TFT is connected to the upper-layer pixel electrode (or lower-layer pixel electrode) only, whereby for the wide viewing angle, one horizontal scan time is divided in two, so that the voltage is applied to each pixel electrode during each divided horizontal scan time; whereas for the narrow viewing angle, during one horizontal scan time without any division, the voltage is applied to the lower-layer pixel electrode only.

Alternatively, instead of using an n-type semiconductor in one TFT and a p-type semiconductor in the other, the two TFTs may be given different threshold voltages by making the thickness of the gate insulating film different in each, thereby enabling a wide viewing angle and a narrow viewing angle. For example, the threshold voltage of the first TFT may be set to a low value (for example +5 V), and the threshold voltage of the second TFT may be set higher than that of the first TFT (for example, +15 V). Then, in order to select a narrow viewing angle, a voltage insufficient to drive the second TFT (for example, a voltage between +5 V and +15 V) is applied, thus driving only the lower-layer pixel electrode; and in order to select a wide viewing angle, a voltage sufficient to drive the second TFT is applied.

This difference in the threshold voltages may be created not only by changing the thickness of the gate insulating film, but also by changing the material of the gate insulating film or changing the material or the amount of impurities in the ohmic contact layers. For example, the gate line may be made of tantalum, and at least one part of it may be selectively anodized, and then the entire surface can be coated with silicon nitride, thus providing a TFT with a different threshold voltage. In this case, since the threshold voltage can be easily changed by selectively anodizing, the increase in costs can be held to a minimum.

Next, the method of setting the initial viewing angle direction of the liquid crystal in the liquid crystal display devices in the third through seventh embodiments above will be explained.

With a narrow viewing angle, the viewing angle should ideally be narrow in every direction, but since this is difficult to attain in practice, the narrowing of the viewing angles to the right and left is most strongly in demand. Again, with a wide angle of visibility, the viewing angle should ideally be wide in all directions, but since this is also difficult to attain in practice, the widening of the viewing angles to the right and left is most strongly in demand.

Generally, in the TN-type liquid crystal display panels, there is an optimum viewing angle determined by the rubbing direction of the alignment layer and the direction of the twist of the liquid crystal molecules (clockwise/counterclockwise). Further, when the initial viewing angle is set wide in either the horizontal (right-left) or vertical (up-down) direction, it is set narrow in the other direction. Since the wide viewing angle is usually given priority, the initial viewing angle is set wide horizontally, and an optimum viewing angle is set in the vertical direction (the up direction is usually called "twelve o'clock," and the down direction "six o'clock"). For example, if the optimum viewing angle is set at twelve o'clock, it will be difficult to view the display from six o'clock. With such a structure, switching between the wide and narrow viewing angles explained in the third through seventh embodiments causes widening of the viewing angle horizontally when the wide viewing angle is selected, but causes no change from the viewing angle which was initially set when the narrow viewing angle is selected. In short, since the visibility is wider in absolute terms when the wide viewing angle is selected, but is not narrower in absolute terms when the narrow viewing angle is selected, there were cases when such a structure was insufficient.

Thus, the present invention has a structure in which the initial viewing angle is set wide vertically (in other words it is set narrow in the horizontal direction), and an optimum viewing angle is set in the horizontal (three o'clock-nine o'clock) direction. Here, it is preferable to set the optimum viewing angle so that the viewing field extends to the right and left of center in equal amounts. In this way, if the viewing angle is initially set narrow horizontally, switching between the wide and narrow viewing angles explained above causes widening of the viewing angle to the right and left when the wide viewing angle is selected, and causes a sufficiently narrow viewing angle even when the narrow viewing angle is selected.

In the third through seventh embodiments above, silicon nitride was used for the inter-layer insulating film 113, but alternatively silicon oxide or a transparent organic resin such as acrylic resin could also be used.

Figure 19:
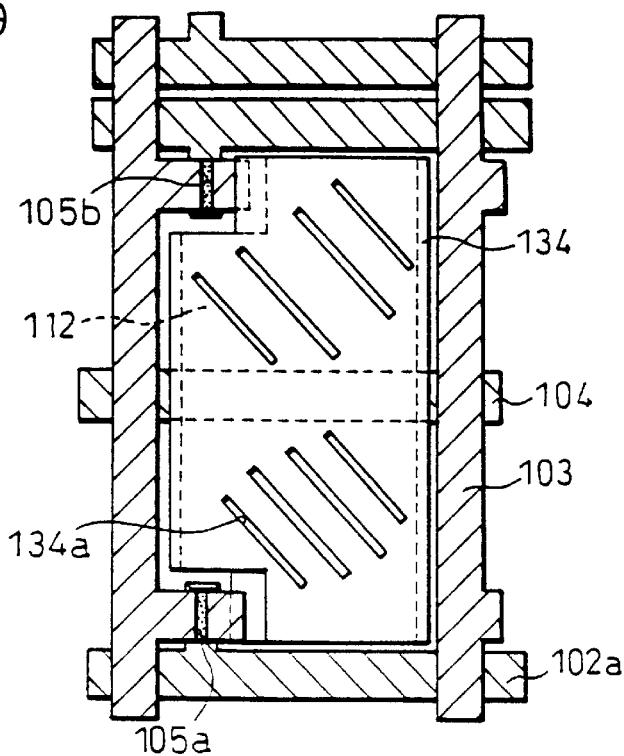
FIG. 19 is a plan view showing another structure for pixel electrodes on the uppermost layer in a liquid crystal display device.
Figure 20:
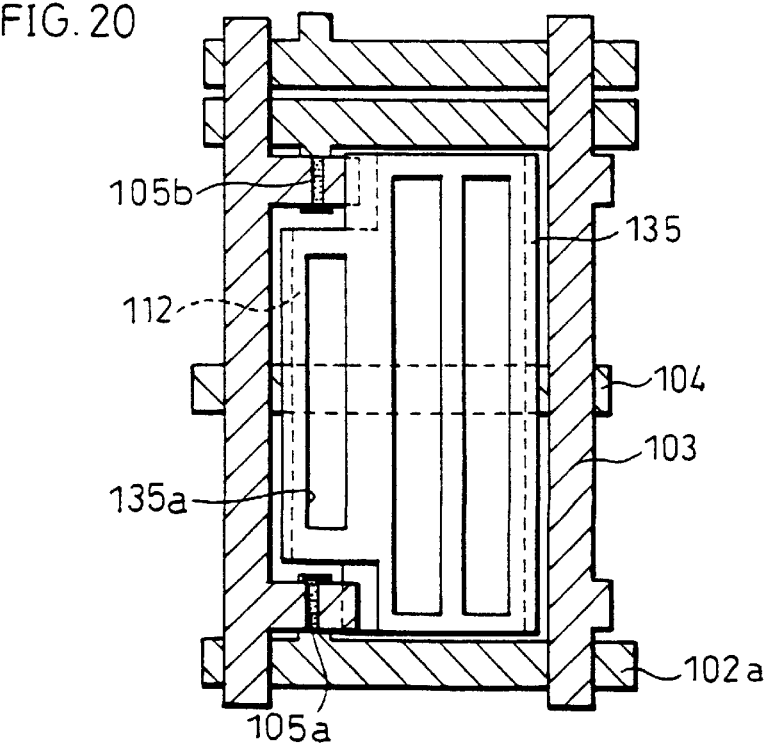
FIG. 20 is a plan view showing a further structure for pixel electrodes on the uppermost layer in a liquid crystal display device.
Figure 21A:
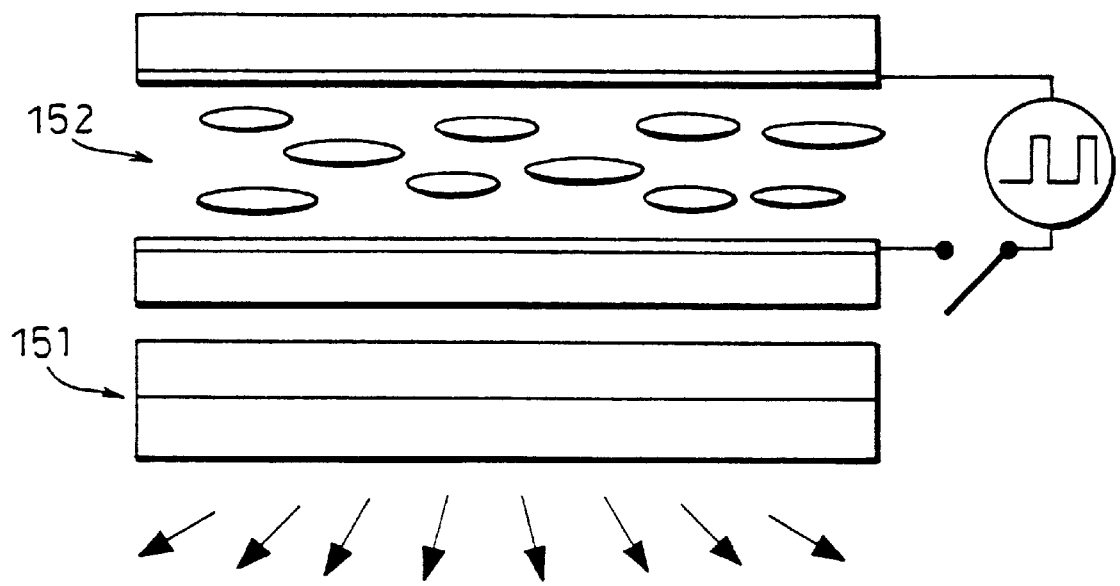
FIG. 21(a) is an explanatory diagram showing a structure of a conventional liquid crystal display device, and showing the widening of the viewing angle.
Figure 21B:
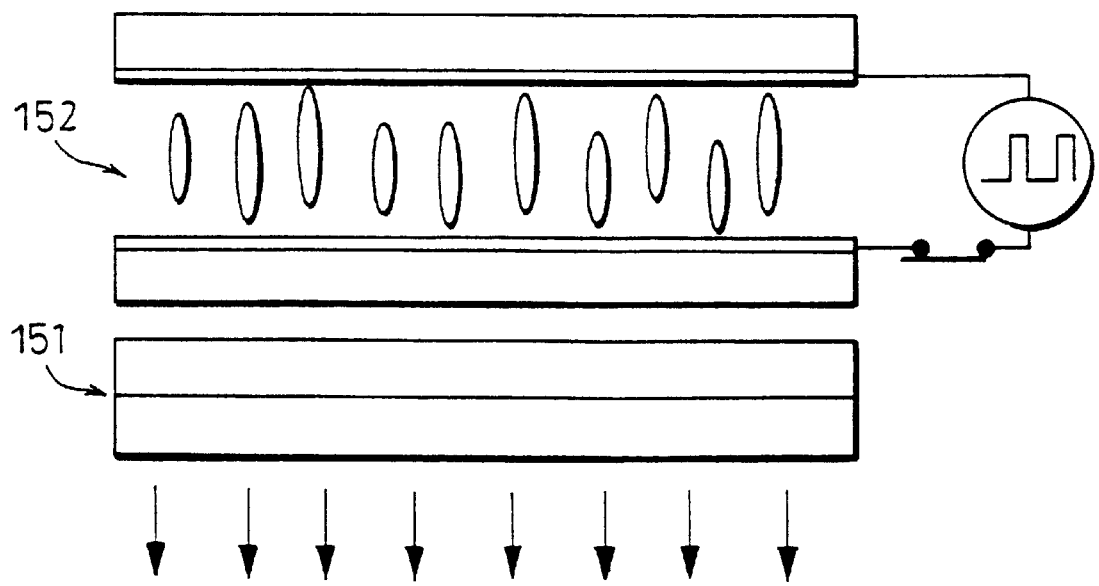
FIG. 21(b) is an explanatory diagram showing the narrowing of the viewing angle in the conventional liquid crystal display device shown in FIG. 21(a).

Again, in the third through seventh embodiments above, the holes in the upper-layer pixel electrode were an arrangement of diamond-shaped holes, but there is no need to be limited to this. For example, other possibilities include a structure in which holes 134a in upper-layer pixel electrode 134 are provided in the shape of diagonal stripes (slits) (see FIG. 19), and a structure in which holes 135a in upper-layer pixel electrode 135 are provided in the shape of vertical stripes (slits) (see FIG. 20).

The area of the inter-layer insulating film (the area of the holes), however, must have a certain proportion to the area of the upper-layer pixel electrode (the area other than the holes). This proportion should be set so as to achieve widening of the viewing angle through the mixture, in the human eye, of the information from the part with holes with that from the part without holes.

Providing the holes in the same direction as the rubbing direction is advantageous because defects from rubbing will not occur. For example, in the case of the arrangement of diamond-shaped holes in FIG. 16, the rubbing is performed in a 45-degree angle direction (parallel to the sides of the diamond shapes). Further, small holes such as the holes 114a in FIG. 16 are preferable to holes which are too large in size, because the smaller holes will not be noticeable. A hole size of 50 μm square or less is preferable.

The concrete embodiments and implementation examples discussed in the foregoing detailed explanation of the present invention serve solely to illustrate the technical details of the invention, which should not be narrowly interpreted within the limits of such concrete examples, but rather may be applied in many variations without departing from the spirit of this invention and the scope of the patent claims set forth below.

What is claimed is:

1. A liquid crystal display device comprising:
   a first substrate having switching elements, scanning lines which send driving signals to operate said switching elements, signal lines which send image signals to said switching elements and pixel electrodes connected to said switching elements;
   a second substrate, provided opposite said first substrate, having a counter electrode; and
   liquid crystal filling the space between said first substrate and said second substrate, wherein a display mode of the liquid crystal display device is a TN mode where liquid crystal molecules of the liquid crystal are twist-aligned between the first substrate and the second substrate, wherein areas are created within the same pixel where the effective voltage of liquid crystal differs, thereby effecting a wide viewing angle, by forming one or more holes in at least one of the pixel electrodes, and wherein a holes area of the one pixel electrode has a predetermined proportion to a non-holes area of the pixel electrode, said proportion being set to effect widening of the viewing angle through a mixture, in human eye, of information from the holes area with that from the non-holes area.

2. The liquid crystal display device according to claim 1, wherein said proportion is set to effect a wide viewing angle.

3. The liquid crystal display device according to claim 1, wherein said holes are diamond-shaped holes.

4. The liquid crystal display device according to claim 3, wherein each of said holes has a size of 50 $\mu$m or less.

5. The liquid crystal display device according to claim 4, wherein one of the sides of each of said diamond-shaped holes is parallel to a rubbing direction.

6. The liquid crystal display device according to claim 1, wherein said holes are in the shape of stripes.

7. The liquid crystal display device according to claim 6, wherein said holes in the shape of stripes are parallel to sides of said pixel electrodes.

8. The liquid crystal display device according to claim 6, wherein said holes in the shape of stripes are diagonal to sides of said pixel electrodes.

9. The liquid crystal display device according to claim 1, wherein said holes are parallel to a rubbing direction.

10. The liquid crystal display device according to claim 1, wherein the pixel electrodes are formed of a transparent conductive film.

* * * * *